US012658107B2

(12) United States Patent
Yoon et al.

(10) Patent No.: US 12,658,107 B2
(45) Date of Patent: Jun. 16, 2026

(54) DISPLAY PANEL AND DISPLAY DEVICE INCLUDING THE SAME

(71) Applicant: Samsung Display Co., LTD., Yongin-si (KR)

(72) Inventors: Soo Wan Yoon, Yongin-si (KR); Ji Hoon Song, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/605,393

(22) Filed: Mar. 14, 2024

(65) Prior Publication Data

US 2025/0087137 A1 Mar. 13, 2025

(30) Foreign Application Priority Data

Sep. 8, 2023 (KR) ........................ 10-2023-0119947

(51) Int. Cl.
*G09G 3/32* (2016.01)

(52) U.S. Cl.
CPC ....... *G09G 3/32* (2013.01); *G09G 2300/0426* (2013.01); *G09G 2310/0267* (2013.01); *G09G 2310/08* (2013.01); *G09G 2330/04* (2013.01)

(58) Field of Classification Search
CPC .... G09G 3/3233; G09G 3/32; G09G 2330/04; G09G 2300/0426
See application file for complete search history.

(56) References Cited

U.S. PATENT DOCUMENTS

| | | | | |
|---|---|---|---|---|
| 10,297,194 B2 | 5/2019 | Kim | | |
| 11,379,172 B2 | 7/2022 | Cho | | |
| 12,245,482 B2 * | 3/2025 | Han | H10K 59/121 | |
| 2010/0238094 A1 * | 9/2010 | Cho | G09G 3/3208 | 345/82 |
| 2021/0110747 A1 * | 4/2021 | Fujikawa | G09G 3/006 | |
| 2022/0157915 A1 * | 5/2022 | Lee | G09G 3/3233 | |
| 2023/0113488 A1 * | 4/2023 | Zhao | G09G 3/3291 | 345/204 |
| 2023/0142014 A1 * | 5/2023 | Kim | H10D 89/811 | 257/79 |
| 2024/0395993 A1 * | 11/2024 | Yang | H10H 20/857 | |
| 2025/0022416 A1 * | 1/2025 | Wu | G09G 3/3233 | |

FOREIGN PATENT DOCUMENTS

KR 1020180024910 A 3/2018

* cited by examiner

*Primary Examiner* — Xuemei Zheng
(74) *Attorney, Agent, or Firm* — CANTOR COLBURN LLP

(57) ABSTRACT

A display panel includes pixels, each including a light emitting element and a pixel circuit connected to the light emitting element, data lines arranged in a plurality of columns, where the data lines supply data signals to the pixel circuit, data pads connected to the data lines, a first protection circuit connected between a first data line among the data lines and a first gate power line to which a first gate power voltage is applied, and a second protection circuit connected between a second data line among the data lines and a second gate power line to which a second gate power voltage is applied.

17 Claims, 19 Drawing Sheets

DISPLAY PANEL AND DISPLAY DEVICE INCLUDING THE SAME

This application claims priority to Korean Patent Application No. 10-2023-0119947, filed on Sep. 8, 2023, and all the benefits accruing therefrom under 35 U.S.C. § 119, the content of which in its entirety is herein incorporated by reference.

BACKGROUND

1. Field

Embodiments of the invention relate to a display panel and a display device including the display panel.

2. Description of the Related Art

A display device typically includes a data driver, a gate driver, and pixels. The data driver may provide data signals to pixels through data lines. The gate driver may generate a gate signal using an external start signal and a clock signal, and sequentially provide the gate signal to the pixels through gate lines. Each of the pixels may record a corresponding data signal in response to the gate signal and emit light in response to the data signal.

SUMMARY

In a display device, when static electricity flows into the display device from the outside, the internal circuit of the display device may malfunction or be damaged due to the static electricity. Accordingly, an electrostatic discharge circuit may be electrically connected to the data lines to prevent static electricity from flowing therein.

However, when a constant bias is applied for a long time to operate the electrostatic discharge circuit, the corrosion of a circuit in the display panel may be accelerated due to moisture permeation.

Embodiments of the invention provide a display panel that can effectively protect an internal circuit by including an electrostatic discharge circuit that can alleviate the corrosion of the circuit due to the bias, and a display device including the display panel.

The object of the disclosure is not limited to the aforesaid, but other objects not described herein will be clearly understood by those skilled in the art from descriptions below.

A display panel according to an embodiment of the invention includes pixels, each including a light emitting element and a pixel circuit for driving the light emitting element, data lines arranged in a plurality of columns, where the data lines supply data signals to the pixel circuit, data pads connected to the data lines, a first protection circuit connected between a first data line among the data lines and a first gate power line to which a first gate power voltage is applied, and a second protection circuit connected between a second data line among the data lines and a second gate power line to which a second gate power voltage is applied.

In an embodiment, the pixel circuit may include a first transistor connected between a first power supply and the light emitting element, a second transistor connected between a corresponding one of the data lines and the first transistor, a first pixel node connected between the first transistor and the second transistor, and a second pixel node connected between the first transistor and the light emitting element.

In an embodiment, a semiconductor layer of a transistor constituting the first and second protection circuits may be disposed in a same layer as a semiconductor layer of the first transistor constituting the pixel circuit.

In an embodiment, the first gate power voltage may have a higher voltage level than the second gate power voltage.

In an embodiment, the first protection circuit may include a first transistor, the second protection circuit may include a second transistor, where the first transistor may include a gate electrode, a first electrode connected to the first gate power line and electrically connected to the gate electrode of the first transistor, and a second electrode connected to the first data line, and the second transistor may include a gate electrode electrically connected to the second data line, a first electrode connected to the second gate power line, and a second electrode connected to the second data line.

In an embodiment, the first data line may be an odd-numbered data line among the data lines, and the second data line may be an even-numbered data line among the data lines.

In an embodiment, the display panel may include a plurality of first protection circuits including the first protection circuit and a plurality of second protection circuits including the second protection circuit, a plurality of consecutive first data lines among the data lines may be connected to the plurality of first protection circuits, a plurality of consecutive second data lines among the data lines may be connected to the plurality of second protection circuits, and the plurality of consecutive first protection circuits and the plurality of consecutive second protection circuits may be disposed adjacent to each other.

In an embodiment, the first protection circuit may further include a third transistor, and the second protection circuit may further include a fourth transistor, where the third transistor may include a gate electrode, a first electrode connected to a second electrode of the first transistor, and a second electrode connected to the first gate power line, and the fourth transistor may include a gate electrode, a first electrode connected to a second electrode of the second transistor, and a second electrode connected to the second gate power line.

In an embodiment, the first data line may be an odd-numbered data line among the data lines, and the second data line may be an even-number data line among the data lines.

In an embodiment, the display panel may include a plurality of first protection circuits including the first protection circuit and a plurality of second protection circuits including the second protection circuit, a plurality of consecutive first data lines among the data lines may be connected to the plurality of first protection circuits, a plurality of consecutive second data lines among the data lines may be connected to the plurality of second protection circuits, and the plurality of consecutive first protection circuits and the plurality of consecutive second protection circuits may be disposed adjacent to each other.

A display panel according to an embodiment of the invention includes pixels, each including a light emitting element and a pixel circuit connected to the light emitting element; data lines arranged in a plurality of columns, where the data lines supply data signals to the pixel circuit; data pads connected to the data lines; and protection circuits connected to the data lines, where each of the protection circuits includes first to fourth transistors, where the first transistor includes a gate electrode, a first electrode connected to a first gate power line and electrically connected to the gate electrode of the first transistor, and a second electrode connected to a corresponding one of the data lines, where the second transistor includes a gate electrode, a first electrode connected to a second electrode of the first transistor, and a second electrode electrically connected to the gate electrode of the second transistor and connected to the first gate power line, where the third transistor includes a gate electrode, a first electrode connected to a second gate power line and electrically connected to the gate electrode of the third transistor, and a second electrode connected to the corresponding one of the data lines, and where the fourth transistor includes a gate electrode, a first electrode connected to the second electrode of the third transistor, and a second electrode electrically connected to the gate electrode of the fourth transistor and connected to the second gate power line.

In an embodiment, the pixel circuit may include a first transistor connected between a first power supply and the light emitting element, a second transistor connected between a corresponding one of the data lines and the first transistor, a first pixel node connected between the first transistor and the second transistor, and a second pixel node connected between the first transistor and the light emitting element.

In an embodiment, a semiconductor layer of a transistor constituting the protection circuits may be disposed in a same layer as a semiconductor layer of the first transistor constituting the pixel circuit.

A display device according to an embodiment of the invention includes a display panel including pixels; and a data driver which applies data signals to the pixels, where the display panel includes data lines arranged in a plurality of columns, where the data lines supply data signals to the pixels, data pads connected to the data lines, a first protection circuit connected between a first data line among the data lines and a first gate power line to which a first gate power voltage is applied, and a second protection circuit connected between a second data line among the data lines and a second gate power line to which a second gate power voltage is applied.

In an embodiment, the display device may further include a gate driver which provides a gate signal to the pixels based on a start signal and a clock signal; a start signal line which transmits the start signal to the gate driver; and a clock signal line which transmits the clock signal to the gate driver.

In an embodiment, each of the pixels may include a light emitting element and a pixel circuit connected to the light emitting element, and the pixel circuit may include a first transistor connected between a first power supply and the light emitting element, a second transistor connected between a corresponding one of the data lines and the first transistor, a first pixel node connected between the first transistor and the second transistor, and a second pixel node connected between the first transistor and the light emitting element.

In an embodiment, a semiconductor layer of a transistor constituting the first and second protection circuits may be disposed in a same layer as a semiconductor layer of the first transistor constituting the pixel circuit.

According to embodiments of the invention, it is possible to provide a display panel that can effectively protect an internal circuit by including an electrostatic discharge circuit that can alleviate the corrosion of the circuit due to the bias, and a display device including the display panel.

DETAILED DESCRIPTION

Figure 1:
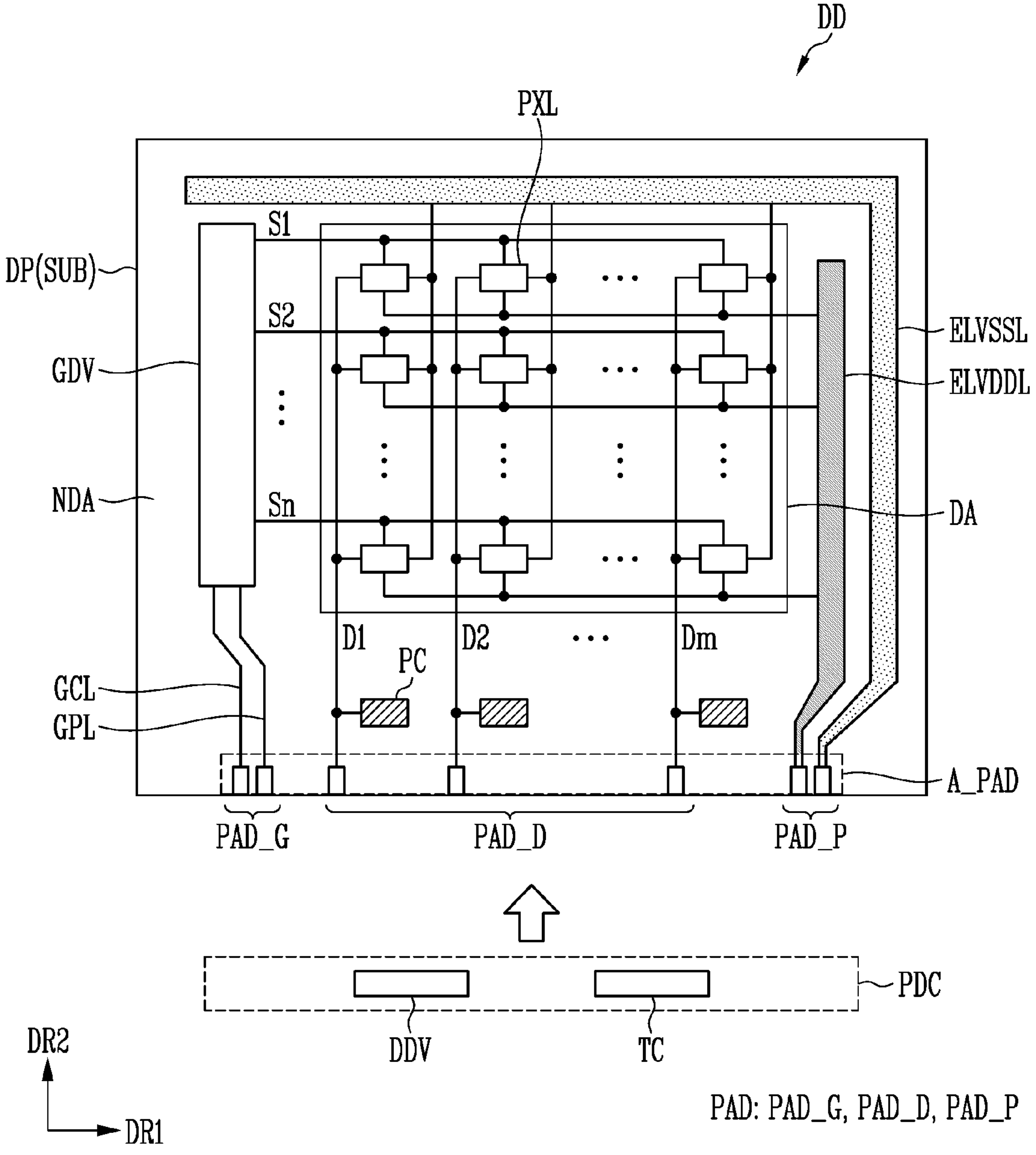
FIG. 1 is a block diagram illustrating a display device according to embodiments of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

Throughout the specification, when a part is said to be "connected" to another part, this includes not only the case where it is "directly connected" but also the case where it is "indirectly connected" with another element therebetween.

The term used in this specification is for the purpose of describing the embodiments and is not intended to limit the invention.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "At least one of X, Y, and Z", and "at least one selected from X, Y, and Z" may be interpreted as an X, a Y, a Z, or any combination (e.g., XYZ, XYY, YZ, and ZZ) of two or more among X, Y, and Z. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Here, terms such as first, second, etc. may be used to describe various components, but these components are not limited to these terms. These terms are used only to distinguish one constituent element from another constituent element. Accordingly, the first component may be referred to as the second component within the scope of what is disclosed herein.

Spatially relative terms such as "below," "above," etc. may be used for descriptive purposes, thereby describing the relationship of one element or feature to another element(s) or feature(s) as shown in the drawings. Spatially relative terms are intended to include different directions in use, operation, and/or manufacture in addition to the directions depicted in the drawings. For example, if the device shown in the drawings is turned over, elements depicted as being disposed "below" other elements or features may be disposed "above" the other elements or features. Accordingly, in an embodiment, the term "below" may include both above and below directions. Additionally, the device may be oriented in other directions (e.g., rotated by 90 degrees or in other orientations), and thus the spatially relative terms used herein should be interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Various embodiments are described with reference to drawings that schematize ideal embodiments. Accordingly, it will be expected that the shapes may vary depending, for example, on tolerances and/or manufacturing techniques. Accordingly, embodiments disclosed herein should not be construed as being limited to the specific shapes shown, and should be construed to include changes in shapes that occur, for example, as a result of manufacturing. As such, the shapes shown in the drawings may not depict the actual shapes of areas of the device, and the embodiments are not limited thereto.

FIG. 1 is a block diagram illustrating a display device according to embodiments of the invention.

Referring to FIG. 1, an embodiment of the display device DD may include a display panel DP, a gate driver GDV (or gate driver circuit), a data driver DDV (or data driver circuit DDV), and a timing controller TC (or timing controller).

The display panel DP may include a substrate SUB. The substrate SUB (or display panel DP) may include a display area DA that displays an image and a non-display area NDA (e.g., edge area of the display area DA) around the display area DA. Pixels PXL may be disposed on the display panel DP. A gate driver GDV, pads PAD, signal lines, etc. may be disposed in the non-display area NDA. The non-display area NDA may include a pad area A_PAD disposed on one side of the display area DA. The pads PAD may be disposed in the pad area A_PAD.

The display panel DP may include gate lines S1 to Sn (where n is a positive integer), data lines D1 to Dm (where m is a positive integer), pixels PXL, and pads PAD. The gate lines S1 to Sn may extend in the first direction DR1 and be sequentially arranged in the second direction DR2 that intersects the first direction. The data lines D1 to Dm may extend in the second direction DR2 and be sequentially arranged in the first direction DR1. Each of the pixels PXL may be connected to a corresponding one of the gate lines S1 to Sn and a corresponding one of the data lines D1 to Dm. The pads PAD may be connected to signal lines (e.g., gate lines S1 to Sn and data lines D1 to Dm) of the display panel DP and transmit signals provided from the outside to the signal lines.

The pads PAD may include gate pads PAD_G, data pads PAD_D, and power pads PAD_P.

The gate pads PAD_G may be configured to transmit a gate control signal to the gate driver GDV through a gate control line GCL. The gate pads PAD_G may be configured to transmit a gate power voltage to the gate driver GDV through a gate power line GPL. The gate control signal may include a start signal (or start pulse), clock signals, etc. The gate control signal may be provided from a timing controller TC. The gate power voltage may be a power voltage or a driving voltage used for operating the gate driver GDV. The gate power voltage may be provided from a power supply (not shown) or a data driver DDV. The gate power voltage may include a first gate power voltage and a second gate power voltage. In an embodiment, for example, the first gate power voltage may be at a turn-on level that turns on at least one transistor included in the pixel PXL. In an embodiment, for example, the second gate power voltage may be at a turn-off level that turns off at least one transistor included in the pixel PXL. However, embodiments of the invention are not limited thereto, and the first gate power voltage may be at a turn-off level, and the second gate power voltage may be at a turn-on level.

The data pads PAD_D may be configured to transmit data signals (or data voltages) to the data lines D1 to Dm. The data signals may be provided from a data driver DDV.

The power pads PAD_P may transmit the first power voltage ELVDD to the pixels PXL through the first power line ELVDDL. The power pads PAD_P may transmit the second power voltage ELVSS to the pixels PXL through the second power line ELVSSL. The first power voltage ELVDD and the second power voltage ELVSS may be power voltages required for operating the pixels PXL and may be provided from the power supply (not shown). The first power voltage ELVDD may have a higher voltage level than the second power voltage ELVSS.

The protection circuits PC may be disposed in the non-display area NDA and/or the display area DA of the display panel DP. In an embodiment, for example, the protection circuits PC may be disposed in the non-display area NDA adjacent to the pad area A_PAD. The protection circuit PC may be connected (e.g., electrically connected) to at least one selected from the data lines D1 to Dm.

The protection circuit PC may be connected to at least one selected from the data lines D1 to Dm to which a pulse-shaped signal or an alternating current signal is applied, and may discharge static electricity (e.g., surge) flowing into the data line from the outside and protect internal circuits (e.g., pixels PXL) from the static electricity. That is, the protection circuit PC may be an electrostatic discharge (ESD) circuit (or ESD protection circuit).

In an embodiment, as shown in FIG. 1, the protection circuit PC may be disposed adjacent to the pad area A_PAD, but the invention is not limited thereto. In an embodiment, for example, the protection circuit PC may be disposed in the pad area A_PAD.

The gate driver GDV may generate a gate signal based on the gate control signal and provide the gate signal to the gate lines S1 to Sn.

According to embodiments, the gate driver GDV may be formed on the display panel DP while being integrated with the pixels PXL. However, embodiments of the invention are not limited thereto. In an embodiment, for example, the gate driver GDV may be implemented as a separate integrated circuit from the display panel DP and be mounted on the panel driver circuit PDC. In an embodiment, as shown in FIG. 1, the gate driver GDV may be disposed in the non-display area NDA, but embodiments of the disclosure are not limited thereto. In an embodiment, for example, the gate driver GDV may be disposed in the display area DA (e.g., between the pixels PXL) in a distributed manner.

The data driver DDV may receive a data control signal and image data from the timing controller TC and generate data signals (or data voltages) corresponding to the image data. The data driver DDV may provide the generated data signals to the display panel DP. In an embodiment, for example, the data driver DDV may generate data signals corresponding to grayscale values in the image data and supply the data signals to the data lines D1 to Dm in units of a pixel row.

The data driver DDV may be mounted on the panel driver circuit PDC, connected to the timing controller TC, and connected to the data lines D1 to Dm through the data pads PAD_D.

The timing controller TC may control the gate driver GDV and the data driver DDV. The timing controller TC may receive input image data (e.g., RGB data) and control signals from external devices (e.g., graphics processor, set-top box, etc.), generate a gate control signal and a data control signal, and generate image data by converting the input image data. The control signal may include a vertical synchronization signal, a horizontal synchronization signal, a data enable signal, a reference clock signal, etc. In an embodiment, for example, the timing controller TC may convert the input image data into image data having a format corresponding to the pixel arrangement in the display panel DP. The timing controller TC may be mounted on the panel driving circuit PDC.

In an embodiment, as shown in FIG. 1, the data driver DDV and the timing controller TC may be implemented as separate integrated circuits, but the invention is not limited thereto. In an embodiment, for example, the data driver DDV and timing controller TC may be implemented as one integrated circuit.

Figure 2:
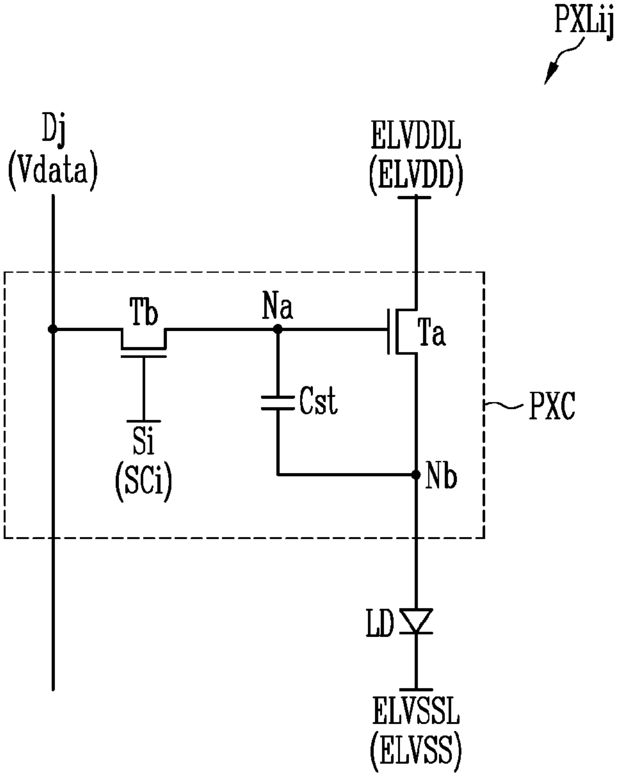
FIG. 2 is a circuit diagram illustrating an embodiment of a pixel included in the display device of FIG. 1.

FIG. 2 is a circuit diagram illustrating an embodiment of a pixel included in the display device of FIG. 1. The pixels PXL shown in FIG. 1 may be substantially the same as or similar to each other. For convenience of description, the pixel PXLij disposed in the i-th pixel row (where i is an integer greater than or equal to 1 and less than or equal to n) and the j-th pixel column (where j is an integer greater than or equal to 1 and less than or equal to m) will be described.

Referring to FIGS. 1 and 2, an embodiment of the pixel PXLij may include a pixel circuit PXC and a light emitting element LD.

The pixel circuit PXC may include at least two switching elements (e.g., transistors) and at least one storage element (e.g., capacitor). Referring to FIG. 2, in an embodiment, the pixel circuit PXC may include a first pixel transistor Ta (or driving transistor Ta), a second pixel transistor Tb (or switching transistor Tb), and a storage capacitor Cst. However, embodiments of the invention are not limited thereto.

The light emitting element LD may generate light of a certain brightness in response to an amount of current supplied from the first pixel transistor Ta. The light emitting element LD may include a first electrode and a second electrode. The first electrode of the light emitting element LD may be connected to a second pixel node Nb. The second electrode of the light emitting element LD may be connected to the second power line ELVSSL to which the second power voltage ELVSS is applied. In an embodiment, the first electrode may be an anode and the second electrode may be a cathode. According to embodiments, the first electrode may be a cathode and the second electrode may be an anode.

The first electrode of the first pixel transistor Ta may be connected to the first power line ELVDDL to which the first power voltage ELVDD is applied. The second electrode of the first pixel transistor Ta may be connected to the first electrode (or the second pixel node Nb) of the light emitting element LD. The gate electrode of the first pixel transistor Ta may be connected to a first pixel node Na. In an embodiment, the first electrode may be a drain electrode and the second electrode may be a source electrode.

The first pixel transistor Ta may control the amount of current flowing to the light emitting element LD in response to the voltage of the first pixel node Na. In such an embodiment, the first pixel transistor Ta may be turned on when the voltage (e.g., gate-source voltage) between the first pixel node Na and the second pixel node Nb is higher than the threshold voltage.

The first electrode of the second pixel transistor Tb may be connected to the j-th data line Dj, and the second electrode of the second pixel transistor Tb may be connected to the first pixel node Na (or the gate electrode of the first pixel transistor Ta). The gate electrode of the second pixel transistor Tb may be connected to the i-th gate line Si. The second pixel transistor Tb may be turned on when the i-th gate signal SCi (or the i-th gate signal SCi at the turn-on level) is supplied to the i-th gate line Si, and may transmit a data voltage from the j-th data line Dj to the first pixel node Na.

The storage capacitor Cst may be connected between the first pixel node Na and the second pixel node Nb. The storage capacitor Cst may charge a data voltage corresponding to the data signal supplied to the first pixel node Na during one frame. Accordingly, the storage capacitor Cst may store a voltage corresponding to a voltage difference between the first pixel node Na and the second pixel node Nb. Whether the first pixel transistor Ta is turned on or off may be determined depending on the voltage stored in the storage capacitor Cst.

In embodiments of the invention, the circuit structure of the pixels PXL is not limited to FIG. 2. In an embodiment, for example, the light emitting element LD may be disposed between the first power line ELVDDL and the first electrode of the first pixel transistor Ta.

In an embodiment, as shown in FIG. 2, the transistor may be an n-channel metal oxide semiconductor (NMOS) transistor, but the invention is not limited thereto. In an embodiment, for example, at least one selected from the first and second pixel transistors Ta and Tb may be implemented as a p-channel metal oxide semiconductor (PMOS) transistor. In an embodiment, the first and second pixel transistors Ta and Tb shown in FIG. 2 may be thin film transistors including at least one selected from an oxide semiconductor, an amorphous silicon semiconductor, and a polycrystalline silicon semiconductor.

Figure 3:
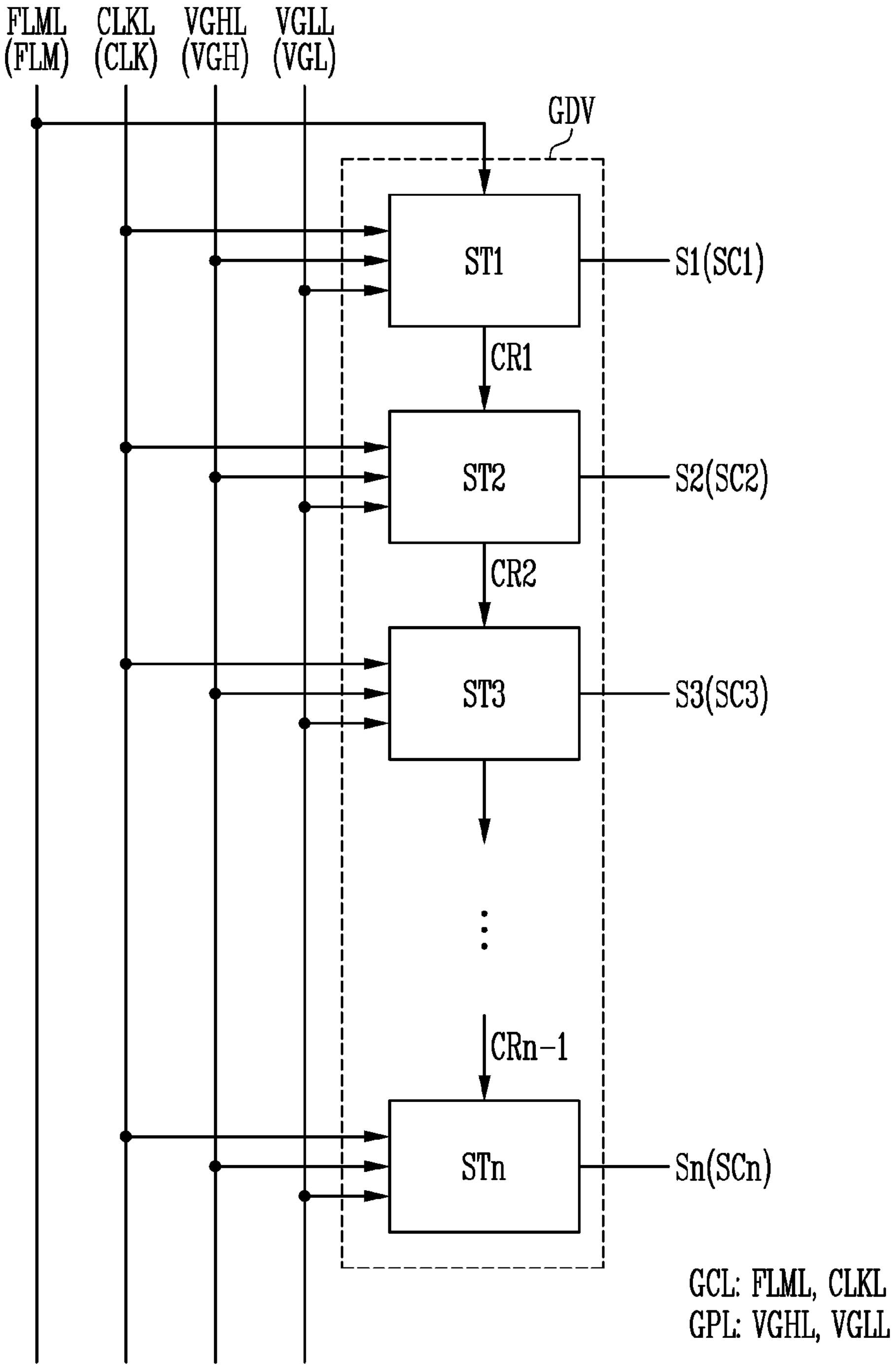
FIG. 3 is a block diagram illustrating an embodiment of a gate driver included in the display device of FIG. 1.
Figure 4:
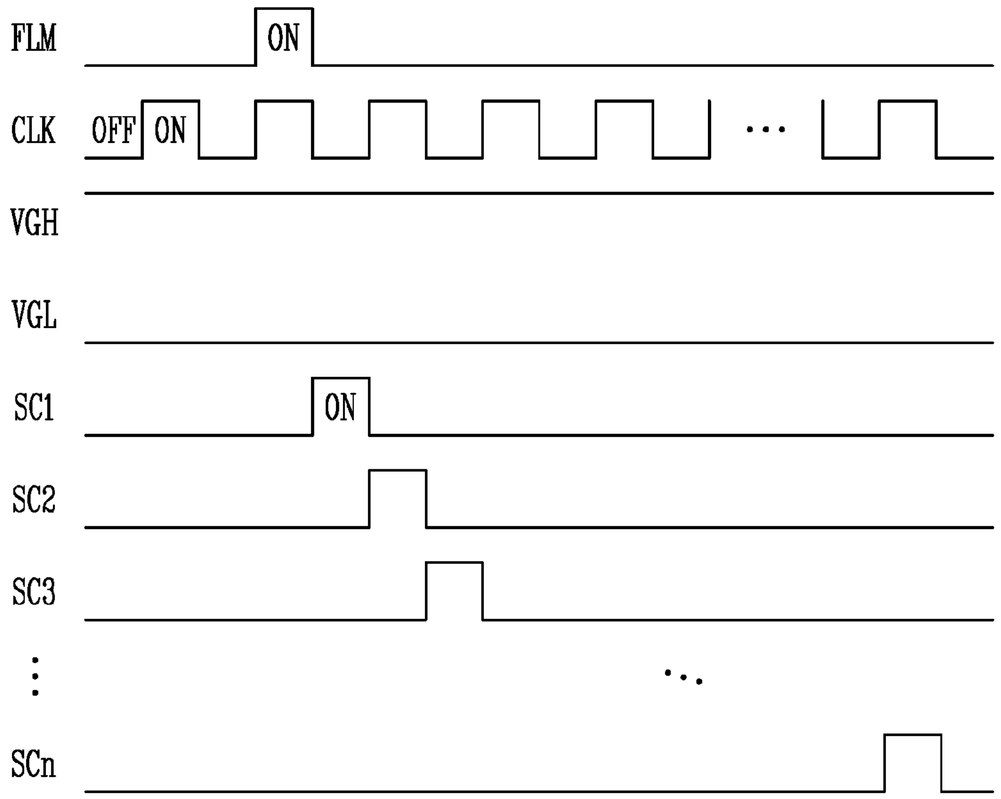
FIG. 4 is a timing diagram illustrating an embodiment of signals measured in the gate driver of FIG. 3.

FIG. 3 is a block diagram illustrating an embodiment of a gate driver included in the display device of FIG. 1. FIG. 4 is a timing diagram illustrating an embodiment of signals measured in the gate driver of FIG. 3.

Referring to FIG. 3, an embodiment of the gate driver GDV may include a plurality of stages ST1 to STn.

The stages ST1 to STn may provide gate signals SC1 to SCn to the gate lines S1 to Sn, respectively.

Each of the stages ST1 to STn may be connected to a first gate power line VGHL, a second gate power line VGLL, and a clock signal line CLKL (or clock signal lines). Here, the first gate power voltage VGH may be applied to the first gate power line VGHL, and the second gate power voltage VGL may be applied to the second gate power line VGLL. The first gate power line VGHL and the second gate power line VGLL may be included in the gate power line GPL. The first gate power voltage VGH may have a high voltage level, and the second gate power voltage VGL may have a low voltage level. A clock signal CLK (or clock signals) may be applied to the clock signal line CLKL. As shown in FIG. 4, the clock signal CLK may alternately have a turn-on level ON (e.g., high voltage level) and a turn-off level OFF (e.g., low voltage level). A start signal FLM (or start pulse FLM) may be applied to the start signal line FLML. As shown in FIG. 4, the start signal FLM may have a pulse at the turn-on level ON. The clock signal line CLKL and start signal line FLML may be included in the gate control line GCL. In FIG. 4, the turn-on level ON is shown to be higher than the turn-off level OFF, but the invention is not limited thereto. In an embodiment, for example, where the transistors included in the stages ST1 to STn are implemented as P-type transistors instead of N-type transistors, the turn-on level ON may be lower than the turn-off level OFF. In such an embodiment, the turn-on level ON may correspond to a low voltage level and the turn-off level OFF may correspond to a high voltage level.

Each of the stages ST1 to STn may be connected to a start signal line FLML or a carry line, and may generate the gate signal in response to the start signal FLM provided through the start signal line FLML or the previous gate signal of the previous stage, i.e., a carry signal.

In an embodiment, for example, the first stage ST1 may be connected to the start signal line FLML and may generate the first gate signal SC1 corresponding to the start signal FLM. As shown in FIG. 4, the first gate signal SC1 may be delayed by a half cycle of the clock signal CLK compared to the start signal FLM, but is not limited thereto. In an embodiment, for example, the second stage ST2 may receive the first gate signal SC1 (or a first carry signal corresponding to the first gate signal SC1) from the first stage ST1 through the first carry line CR1, and may generate a second gate signal SC2 corresponding to the first gate signal SC1. In an embodiment, for example, the third stage ST3 may receive the second gate signal SC2 (or a second carry signal corresponding to the second gate signal SC2) from the second stage ST2 through the second carry line CR2, and may generate a third gate signal SC3 corresponding to the second gate signal SC2. Similarly, the n-th stage STn may receive the previous gate signal (or the (n−1)-th carry signal corresponding to the previous gate signal) from the previous stage (e.g., the (n−1)-th stage) through the (n−1)-th carry line CRn−1, and may generate the n-th gate signal SCn corresponding to the previous gate signal. In an embodiment, as shown in FIG. 4, the stages ST1 to STn may generate (e.g., sequentially generate) gate signals SC1 to SCn in response to the start signal FLM.

Figure 5:
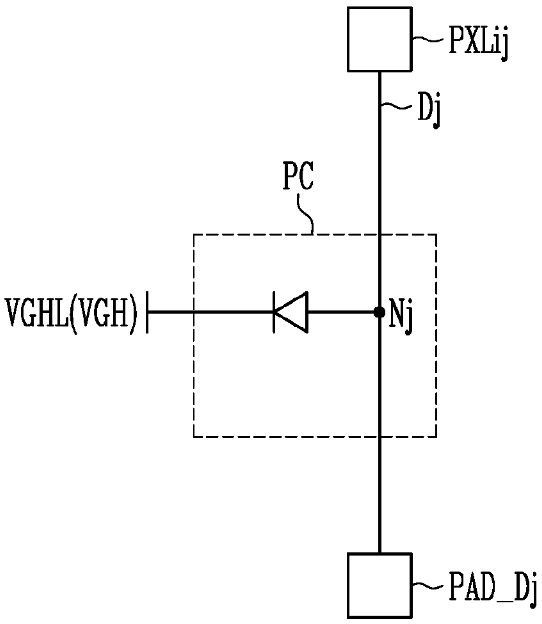
FIG. 5 is a block diagram illustrating an embodiment of a protection circuit according to embodiments of the invention.

FIG. 5 is a block diagram illustrating an embodiment of a protection circuit according to embodiments of the invention. For convenience of description, the protection circuit PC will be described with reference to the pixel PXLij disposed at the i-th pixel row and j-th pixel column.

Referring to FIGS. 1 and 5, the j-th data line Dj may connect a j-th data pad PAD_Dj and the pixel PXLij disposed at the i-th pixel row and the j-th pixel column. The protection circuit PC may be connected to the j-th data line Dj.

In an embodiment, when a voltage higher than the first gate power voltage VGH is applied to the j-th data line Dj due to static electricity, the current (e.g., current due to static electricity) may flow from the j-th data line Dj to the first gate power line VGHL, and a voltage at the j-th data line Dj may decrease. In other words, the protection circuit PC may decrease a voltage higher than the first gate power voltage VGH.

in such an embodiment, the current (e.g., current due to static electricity) may not flow from the first gate power line VGHL to the j-th data line Dj.

In such an embodiment, the voltage at the j-th data line Dj may be maintained lower than the first gate power voltage VGH by the protection circuit PC, and the pixels PXLij disposed at the i-th pixel row and j-th pixel column may be protected from static electricity.

Figure 6:
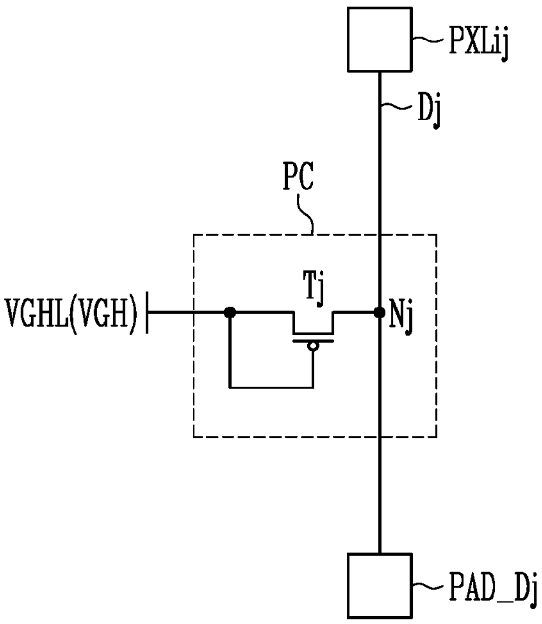
FIG. 6 is a block diagram illustrating an embodiment of the protection circuit of FIG. 5.

FIG. 6 is a block diagram illustrating an embodiment of the protection circuit of FIG. 5.

Referring to FIGS. 1, 5, and 6, an embodiment of the protection circuit PC may include the j-th transistor Tj.

In FIG. 6, the j-th transistor Tj is shown as PMOS transistor, but the invention is not limited thereto. In an embodiment, for example, the j-th transistor Tj may be implemented as NMOS transistor.

The j-th data line Dj may be connected between the j-th data pad PAD_Dj and the pixel PXLij disposed at the i-th pixel row and the j-th pixel column.

The first electrode of the j-th transistor Tj may be connected to the j-th data line Dj at the j-th node Nj. The second electrode of the j-th transistor Tj may be connected to the first gate power line VGHL. The gate electrode of the j-th transistor Tj may be connected to the second electrode of the j-th transistor Tj. The j-th transistor Tj may be formed in a same process as the transistor of the pixel circuit PXC (see FIG. 2). In an embodiment, for example, the semiconductor layer of the j-th transistor Tj and the semiconductor layer of the first pixel transistor Ta (see FIG. 2) constituting the pixel circuit PXC (see FIG. 2) may be disposed in (or directly on) a same layer as each other. When a voltage higher than the first gate power voltage VGH is applied to the j-th data line Dj due to static electricity, the j-th transistor Tj may be turned on. In an embodiment, for example, the j-th transistor Tj may be turned on in response to a voltage difference between the gate electrode and the first electrode of the j-th transistor Tj. In this case, the current may flow from the j-th data line Dj to the first gate power line VGHL, and the voltage of the j-th data line Dj may decrease. That is, the j-th transistor Tj can decrease a voltage higher than the first gate power voltage VGH.

Figure 7:
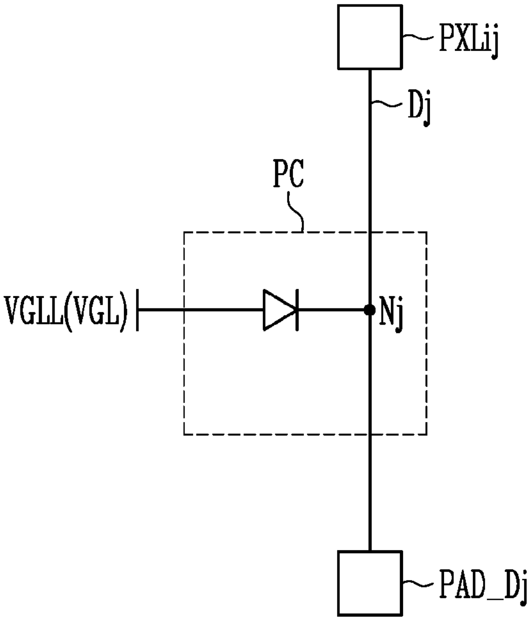
FIG. 7 is a block diagram illustrating an embodiment of a protection circuit according to embodiments of the invention.

FIG. 7 is a block diagram illustrating an embodiment of a protection circuit according to embodiments of the invention. For convenience of description, the protection circuit PC will be described with reference to the pixel PXLij disposed at the i-th pixel row and j-th pixel column.

Referring to FIGS. 1 and 7, in an embodiment, the j-th data line Dj may connect the j-th data pad PAD_Dj and the pixel PXLij disposed at the i-th pixel row and the j-th pixel column. The protection circuit PC may be connected to the j-th data line Dj.

In an embodiment, when a voltage lower than the second gate power voltage VGL is applied to the j-th data line Dj due to static electricity, the current (e.g., current due to static electricity) may flow from the j-th data line Dj to the second gate power line VGLL, and a voltage at the j-th data line Dj may increase. In other words, the protection circuit PC can increase a voltage lower than the second gate power voltage VGL.

In such an embodiment, the current (e.g., current due to static electricity) may not flow from the j-th data line Dj to the second gate power line VGLL.

In an embodiment, the voltage at the j-th data line Dj may be maintained higher than the second gate power voltage VGL by the protection circuit PC, and the pixels PXLij disposed at the i-th pixel row and j-th pixel column may be protected from static electricity.

Figure 8:
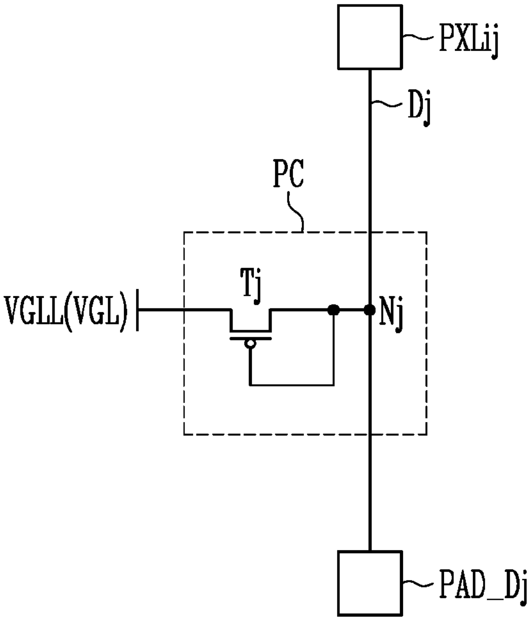
FIG. 8 is a block diagram illustrating an embodiment of the protection circuit of FIG. 7.

FIG. 8 is a block diagram illustrating an embodiment of the protection circuit of FIG. 7.

Referring to FIGS. 1, 7, and 8, an embodiment of the protection circuit PC may include the j-th transistor Tj.

In FIG. 8, the j-th transistor Tj is shown as PMOS transistor, but the invention is not limited thereto. In an embodiment, for example, the j-th transistor Tj may be NMOS transistor.

The j-th data line Dj may be connected between the j-th data pad PAD_Dj and the pixel PXLij disposed at the i-th pixel row and j-th pixel column.

The first electrode of the j-th transistor Tj may be connected to the j-th data line Dj at the j-th node Nj. The second electrode of the j-th transistor Tj may be connected to the second gate power line VGLL. The gate electrode of the j-th transistor Tj may be connected to the first electrode of the j-th transistor Tj. The j-th transistor Tj may be formed in a same process as the transistor of the pixel circuit PXC (see FIG. 2). In an embodiment, for example, the semiconductor layer of the j-th transistor Tj and the semiconductor layer of the first pixel transistor Ta (see FIG. 2) constituting the pixel circuit PXC (see FIG. 2) may be disposed in (or directly on) a same layer as each other.

When a voltage lower than the second gate power voltage VGL is applied to the j-th data line Dj due to static electricity, the j-th transistor Tj may be turned on. In an embodiment, for example, the j-th transistor Tj may be turned on in response to a voltage difference between the gate electrode and the second electrode of the j-th transistor Tj. In this case, the current may flow from the second gate power line VGLL to the j-th data line Dj, and the voltage of the j-th data line Dj may increase. That is, the j-th transistor Tj can increase a voltage lower than the second gate power voltage VGL.

Figure 9:
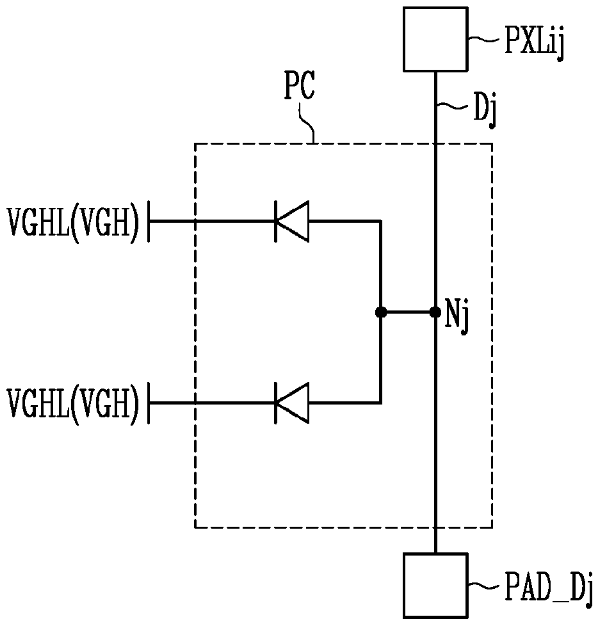
FIG. 9 is a block diagram illustrating an embodiment of the protection circuit included in the display device of FIG. 1.

FIG. 9 is a block diagram illustrating an embodiment of the protection circuit included in the display device of FIG. 1. For convenience of description, the protection circuit PC will be described with reference to the pixel PXLij disposed at the i-th pixel row and j-th pixel column.

Referring to FIGS. 1 and 9, in an embodiment, the j-th data line Dj may connect the j-th data pad PAD_Dj and the pixel PXLij disposed at the i-th pixel row and j-th pixel column. The protection circuit PC may be connected to the j-th data line Dj.

In an embodiment, when a voltage higher than the second gate power voltage VGL is applied to the j-th data line Dj due to static electricity, the current (e.g., current due to static electricity) may flow from the j-th data line Dj to the first gate power line VGHL, and a voltage at the j-th data line Dj may decrease. In other words, the protection circuit PC can decrease a voltage higher than the first gate power voltage VGH.

In such an embodiment, the current (e.g., current due to static electricity) may not flow from the first gate power line VGHL to the j-th data line Dj.

In an embodiment, the voltage at the j-th data line Dj may be maintained lower than the first gate power voltage VGH By the protection circuit PC, and the pixels PXLij disposed at the i-th pixel row and j-th pixel column may be protected from static electricity.

Figure 10:
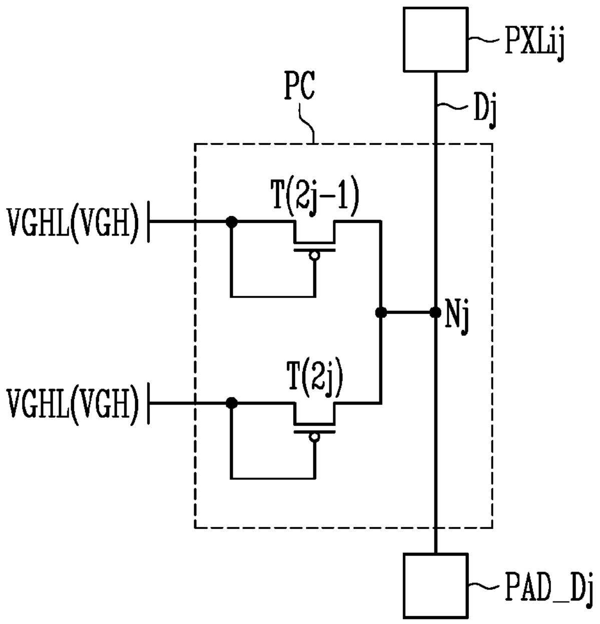
FIG. 10 is a block diagram illustrating an embodiment of the protection circuit of FIG. 9.

FIG. 10 is a block diagram illustrating an embodiment of the protection circuit of FIG. 9.

Referring to FIGS. 1, 9, and 10, the protection circuit PC may include a (2j−1)-th transistor T(2j−1) and a 2j-th transistor T(2j).

In FIG. 10, each of the (2j−1)-th transistor T(2j−1) and the 2j-th transistor T(2j) is shown as a PMOS transistor, but is not limited thereto. In an embodiment, for example, at least one of the (2j−1)-th transistor T(2j−1) and the 2j-th transistor T(2j) may be implemented as NMOS transistor.

The j-th data line Dj may be connected between the j-th data pad PAD_Dj and the pixel PXLij disposed at the i-th pixel row and j-th pixel column.

The first electrode of the (2j−1)-th transistor T(2j−1) may be connected to the j-th data line Dj at the j-th node Nj. The second electrode of the (2j−1)-th transistor T(2j−1) may be connected to the first gate power line VGHL. The gate electrode of the (2j−1)-th transistor T(2j−1) may be connected to the second electrode of the (2j−1)-th transistor T(2j−1).

The first electrode of the 2j-th transistor T(2j) may be connected to the j-th data line Dj at the j-th node Nj. The second electrode of the 2j-th transistor T(2j) may be connected to the first gate power line VGHL. The gate electrode of the 2j-th transistor T(2j) may be connected to the second electrode of the 2j-th transistor T(2j). The first electrode of the (2j−1)-th transistor T(2j−1) may be connected to the first electrode of the 2j-th transistor T(2j).

In an embodiment, when a voltage higher than the first gate power voltage VGH is applied to the j-th data line Dj due to static electricity, the (2j−1)-th transistor T(2j−1) may be turned on. In an embodiment, for example, the (2j−1)-th transistor T(2j−1) may be turned on in response to a voltage difference between the gate electrode and the first electrode of the (2j−1)-th transistor T(2j−1). In this case, the current may flow from the j-th data line Dj to the first gate power line VGHL, and the voltage of the j-th data line Dj may decrease. That is, the (2j−1)-th transistor T(2j−1) can decrease a voltage higher than the first gate power voltage VGH.

In such an embodiment, when a voltage higher than the first gate power voltage VGH is applied to the j-th data line Dj due to static electricity, the 2j-th transistor T(2j) may be turned on. In an embodiment, for example, the 2j-th transistor T(2j) may be turned on in response to a voltage difference between the gate electrode and the first electrode of the 2j-th transistor T(2j). In this case, the current may flow from the j-th data line Dj to the first gate power line VGHL, and the voltage of the j-th data line Dj may decrease. That is, the 2j-th transistor T(2j) can decrease a voltage higher than the first gate power voltage VGH.

According to an embodiment, as described above, at least one selected from the (2j−1)-th transistor T(2j−1) and the 2j-th transistor T(2j) may be turned on when a voltage higher than the first gate power voltage VGH is applied to the j-th data line Dj due to static electricity, and reliability in terms of the removal of the static electricity can be improved.

Figure 11:
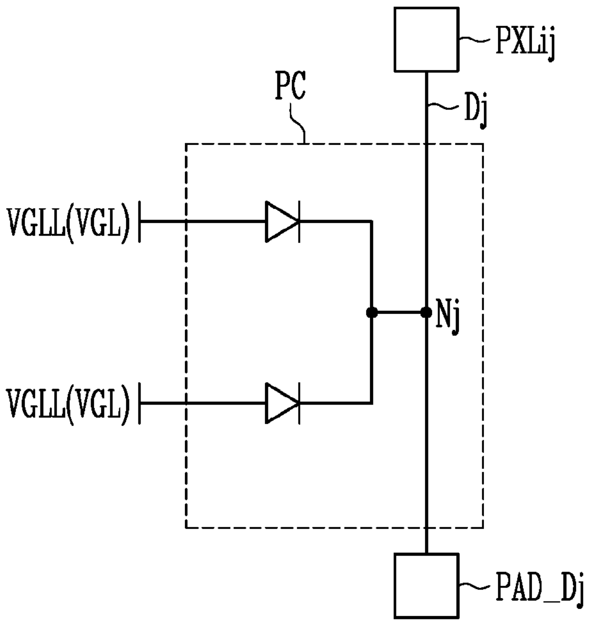
FIG. 11 is a block diagram illustrating an embodiment of the protection circuit included in the display device of FIG. 1.

FIG. 11 is a block diagram illustrating an embodiment of the protection circuit included in the display device of FIG. 1. For convenience of description, the protection circuit PC will be described with reference to the pixel PXLij disposed at the i-th pixel row and j-th pixel column.

Referring to FIGS. 1 and 11, in an embodiment, the j-th data line Dj may connect the j-th data pad PAD_Dj and the pixel PXLij disposed at the i-th pixel row and the j-th pixel column. The protection circuit PC may be connected to the j-th data line Dj.

In an embodiment, when a voltage lower than the second gate power voltage VGL is applied to the j-th data line Dj due to static electricity, the current (e.g., current due to static electricity) may flow from the j-th data line Dj to the second gate power line VGLL, and a voltage at the j-th data line Dj may decrease. In other words, the protection circuit PC can increase a voltage lower than the second gate power voltage VGL.

In such an embodiment, the current (e.g., current due to static electricity) may not flow from the j-th data line Dj to the second gate power line VGLL.

In an embodiment, the voltage at the j-th data line Dj may be maintained higher than the second gate power voltage VGL by the protection circuit PC, and the pixels PXLij disposed at the i-th pixel row and j-th pixel column may be protected from static electricity.

Figure 12:
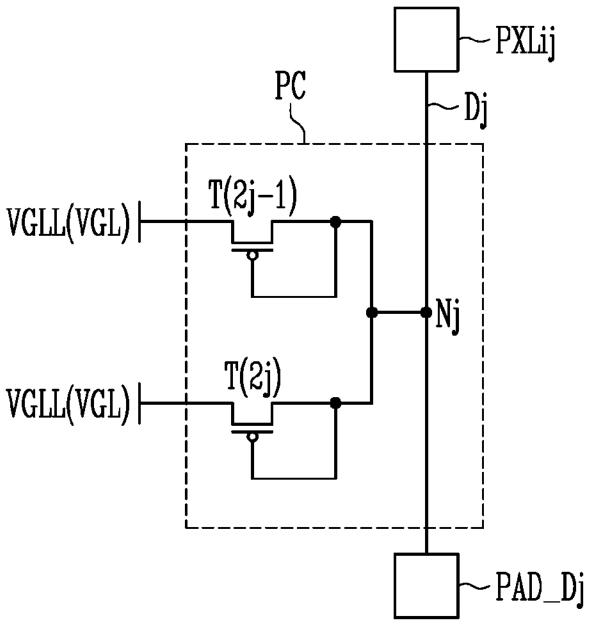
FIG. 12 is a block diagram illustrating an embodiment of the protection circuit of FIG. 11.

FIG. 12 is a block diagram illustrating an embodiment of the protection circuit of FIG. 11.

Referring to FIGS. 1, 11, and 12, in an embodiment, the protection circuit PC may include a (2j−1)-th transistor T(2j−1) and a 2j-th transistor T(2j).

In FIG. 12, the (2j−1)-th transistor T(2j−1) and the 2j-th transistor T(2j) are shown as PMOS transistors, but are not limited thereto. In an embodiment, for example, the (2j−1)-th transistor T(2j−1) and the 2j-th transistor T(2j) may be implemented as NMOS transistors.

The j-th data line Dj may be connected between the j-th data pad PAD_Dj and the pixel PXLij disposed at the i-th pixel row and j-th pixel column.

The first electrode of the (2j−1)-th transistor T(2j−1) may be connected to the j-th data line Dj at the j-th node Nj. The second electrode of the (2j−1)-th transistor T(2j−1) may be connected to the second gate power line VGLL. The gate electrode of the (2j−1)-th transistor T(2j−1) may be connected to the first electrode of the (2j−1)-th transistor T(2j−1).

The first electrode of the 2j-th transistor T(2j) may be connected to the j-th data line Dj at the j-th node Nj. The second electrode of the 2j-th transistor T(2j) may be connected to the second gate power line VGLL. The gate electrode of the 2j-th transistor T(2j) may be connected to the first electrode of the 2j-th transistor T(2j). The first electrode of the (2j−1)-th transistor T(2j−1) may be connected to the first electrode of the 2j-th transistor T(2j).

In an embodiment, when a voltage lower than the second gate power voltage VGL is applied to the j-th data line Dj due to static electricity, the (2j−1)-th transistor T(2j−1) may be turned on. In an embodiment, for example, the (2j−1)-th transistor T(2j−1) may be turned on in response to a voltage difference between the gate electrode and the second electrode of the (2j−1)-th transistor T(2j−1). In this case, the current may flow from the second gate power line VGLL to the j-th data line Dj, and the voltage of the j-th data line Dj may increase. That is, the (2j−1)-th transistor T(2j−1) can increase a voltage lower than the second gate power voltage VGL.

In such an embodiment, when a voltage lower than the second gate power voltage VGL is applied to the j-th data line Dj due to static electricity, the 2j-th transistor T(2j) may be turned on. In an embodiment, for example, the 2j-th transistor T(2j) may be turned on in response to a voltage difference between the gate electrode and the second electrode of the 2j-th transistor T(2j). In this case, the current may flow from the second gate power line VGLL to the j-th data line Dj, and the voltage of the j-th data line Dj may increase. That is, the 2j-th transistor T(2j) can increase a voltage lower than the second gate power voltage VGL.

According to an embodiment, as described above, at least one selected from the (2j−1)-th transistor T(2j−1) and the 2j-th transistor T(2j) may be turned on when a voltage lower than the second gate power voltage VGL is applied to the j-th data line Dj due to static electricity, and reliability in terms of the removal of the static electricity can be improved.

Figure 13:
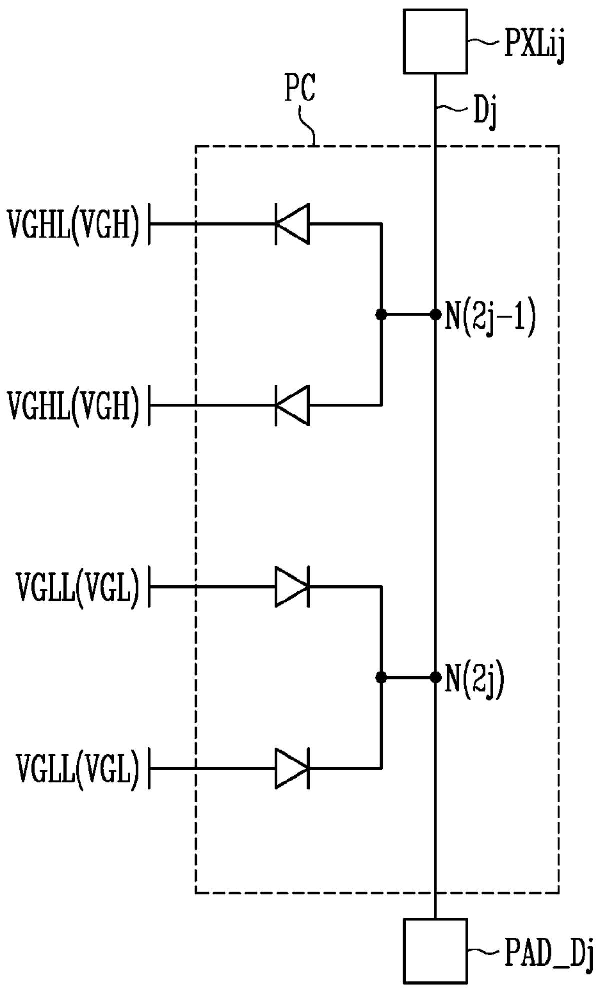
FIG. 13 is a block diagram illustrating an embodiment of the protection circuit included in the display device of FIG. 1.

FIG. 13 is a block diagram illustrating an embodiment of the protection circuit included in the display device of FIG. 1. For convenience of description, the protection circuit PC will be described with reference to the pixel PXLij disposed at the i-th pixel row and j-th pixel column.

Referring to FIGS. 1 and 13, in an embodiment, the j-th data line Dj may connect the j-th data pad PAD_Dj and the pixel PXLij disposed at the i-th pixel row and the j-th pixel column. The protection circuit PC may be connected to the j-th data line Dj.

In an embodiment, when a voltage higher than the first gate power voltage VGH is applied to the j-th data line Dj due to static electricity, the current (e.g., current due to static electricity) may flow from the j-th data line Dj to the first gate power line VGHL, and a voltage at the j-th data line Dj may decrease. In other words, the protection circuit PC can decrease a voltage higher than the first gate power voltage VGH. The current (e.g., current due to static electricity) may not flow from the first gate power line VGHL to the j-th data line Dj.

In such an embodiment, when a voltage lower than the second gate power voltage VGL is applied to the j-th data line Dj due to static electricity, the current (e.g., current due to static electricity) may flow from the j-th data line Dj to the second gate power line VGLL, and a voltage at the j-th data line Dj may decrease. In other words, the protection circuit PC can increase a voltage lower than the second gate power voltage VGL. The current (e.g., current due to static electricity) may not flow from the j-th data line Dj to the second gate power line VGLL.

In such an embodiment, the voltage on the j-th data line Dj may be maintained between the first gate power voltage VGH and the second gate power voltage VGL by the protection circuit PC. In such an embodiment, the pixels PXLij disposed at the i-th pixel row and j-th pixel column can be protected from static electricity by the protection circuit PC.

Figure 14:
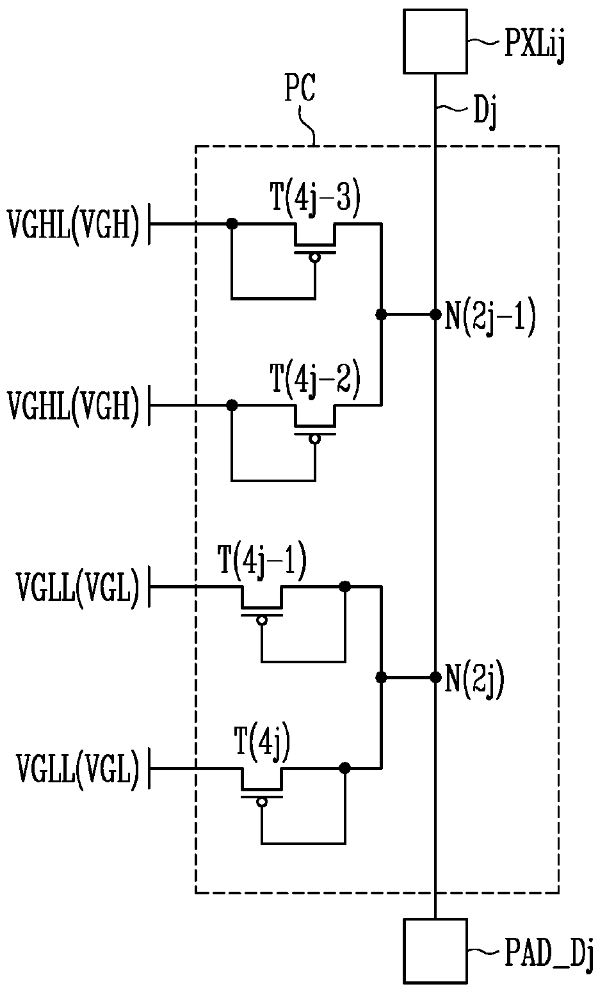
FIG. 14 is a block diagram illustrating an embodiment of the protection circuit of FIG. 13.

FIG. 14 is a block diagram illustrating an embodiment of the protection circuit of FIG. 13.

Referring to FIGS. 1, 13, and 14, in an embodiment, the protection circuit PC may include a (4j−3)-th transistor T(4j−3), a (4j−2)-th transistor T(4j−2), a (4j−1)-th transistor T(4j−1), and a 4j-th transistor T(4j).

In FIG. 14, the (4j−3)-th transistor T(4j−3) to the 4j-th transistor T(4j) is shown as PMOS transistors, but is not limited thereto. In an embodiment, for example, the (4j−3)-th transistor T(4j−3) to the 4j-th transistors T(4j) may be implemented as NMOS transistors.

The j-th data line Dj may be connected between the j-th data pad PAD_Dj and the pixel PXLij disposed at the i-th pixel row and j-th pixel column.

The first electrode of the (4j−3)-th transistor T(4j−3) may be connected to the j-th data line Dj at a (2j−1)-th node N(2j−1). The second electrode of the (4j−3)-th transistor T(4j−3) may be connected to the first gate power line VGHL. The gate electrode of the (4j−3)-th transistor T(4j−3) may be connected to the second electrode of the (4j−3)-th transistor T(4j−3).

The first electrode of the (4j−2)-th transistor T(4j−2) may be connected to the j-th data line Dj at the (2j−1)-th node N(2j−1). The second electrode of the (4j−2)-th transistor T(4j−2) may be connected to the first gate power line VGHL. The gate electrode of the (4j−2)-th transistor T(4j−2) may be connected to the second electrode of the (4j−2)-th transistor T(4j−2).

The first electrode of the (4j−1)-th transistor T(4j−1) may be connected to the j-th data line Dj at a 2j-th node N(2j). The second electrode of the (4j−1)-th transistor T(4j−1) may be connected to the second gate power line VGLL. The gate electrode of the (4j−1)-th transistor T(4j−1) may be connected to the first electrode of the (4j−1)-th transistor T(4j−1).

The first electrode of the 4j-th transistor T(4j) may be connected to the j-th data line Dj at the 2j-th node N(2j). The second electrode of the 4j-th transistor T(4j) may be connected to the second gate power line VGLL. The gate electrode of the 4j-th transistor T(4j) may be connected to the first electrode of the 4j-th transistor T(4j). The first electrode of the (4j−1)-th transistor T(4j−1) may be connected to the first electrode of the 4j-th transistor T(4j).

In an embodiment, when a voltage higher than the first gate power voltage VGH is applied to the j-th data line Dj due to static electricity, the (4j−3)-th transistor T(4j−3) may be turned on. In an embodiment, for example, the (4j−3)-th transistor T(4j−3) may be turned on in response to a voltage difference between the gate electrode and the first electrode of the (4j−3)-th transistor T(4j−3). In this case, the current may flow from the j-th data line Dj to the first gate power line VGHL, and the voltage of the j-th data line Dj may decrease. That is, the (4j−3)-th transistor T(4j−3) can decrease a voltage higher than the first gate power voltage VGH.

In such an embodiment, when a voltage higher than the first gate power voltage VGH is applied to the j-th data line Dj due to static electricity, the (4j−2)-th transistor T(4j−2) may be turned on. In an embodiment, for example, the (4j−2)-th transistor T(4j−2) may be turned on in response to a voltage difference between the gate electrode and the first electrode of the (4j−2)-th transistor T(4j−2). In this case, the current may flow from the j-th data line Dj to the first gate power line VGHL, and a voltage of the j-th data line Dj may decrease. That is, the (4j−2)-th transistor T(4j−2) can decrease a voltage higher than the first gate power voltage VGH.

In such an embodiment, when a voltage lower than the second gate power voltage VGL is applied to the j-th data line Dj due to static electricity, the (4j−1)-th transistor T(4j−1) may be turned on. In an embodiment, for example, the (4j−1)-th transistor T(4j−1) may be turned on in response to a voltage difference between the gate electrode and the second electrode of the (4j−1)-th transistor T(4j−1). In this case, the current may flow from the second gate power line VGLL to the j-th data line Dj, and the voltage of the j-th data line Dj may increase. That is, the (4j−1)-th transistor T(4j−1) can increase a voltage lower than the second gate power voltage VGL.

In such an embodiment, when a voltage lower than the second gate power voltage VGL is applied to the j-th data line Dj due to static electricity, the 4j-th transistor T(4j) may be turned on. In an embodiment, for example, the 4j-th transistor T(4j) may be turned on in response to a voltage difference between the gate electrode and the second electrode of the 4j-th transistor T(4j). In this case, the current may flow from the second gate power line VGLL to the j-th data line Dj, and the voltage of the j-th data line Dj may increase. That is, the 4j-th transistor T(4j) can increase a voltage lower than the second gate power voltage VGL.

According to an embodiment, as described above, at least one selected from the (4j−3)-th transistor T(4j−3) and the (4j−2)-th transistor T(4j−2) may be turned on when a voltage higher than the first gate power voltage VGH is applied to the j-th data line Dj due to static electricity, and may increase reliability in terms of the removal of a voltage (e.g., voltage caused by static electricity) higher than the first gate power voltage VGH. In such an embodiment, at least one selected from the (4j−1)-th transistor T(4j−1) and the 4j-th transistor T(4j) may be turned on when a voltage lower than the second gate power voltage VGL is applied to the j-th data line Dj due to static electricity, and may increase reliability in terms of the removal of a voltage (e.g., voltage caused by static electricity) lower than the second gate power voltage VGL.

Figure 15:
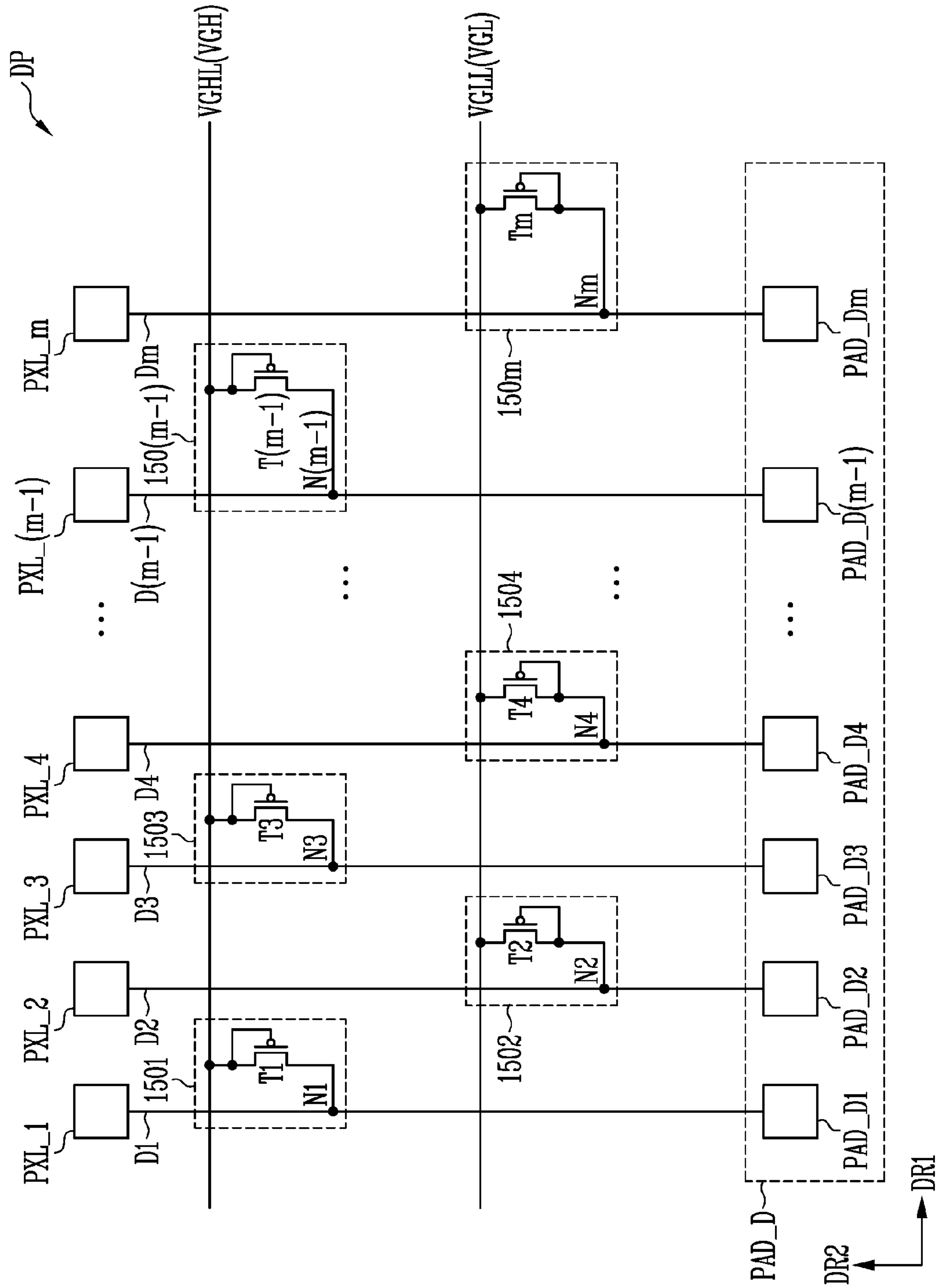
FIG. 15 is a block diagram illustrating an embodiment of a display panel including the protection circuit of FIGS. 6 and 8.

FIG. 15 is a block diagram illustrating an embodiment of a display panel including the protection circuit of FIGS. 6 and 8.

Referring to FIGS. 6, 8, and 15, an embodiment of the display panel DP may include data pads PAD_D, data lines D1 to Dm, a first gate power line VGHL, a second gate power line VGLL, and protection circuits 1501 to 150*m*.

The data pads PAD_D may include first to m-th data pads PAD_D1 to PAD_Dm.

The data lines D1 to Dm may extend in the second direction DR2 and be sequentially arranged in the first direction DR1.

The first data line D1 may connect the first data pad PAD_D1 and a pixel PXL_1 among the pixels disposed at the first pixel column. The first protection circuit 1501 may be connected to the first data line D1 at a first node N1.

The second data line D2 may connect the second data pad PAD_D2 and a pixel PXL_2 among the pixels disposed at the second pixel column. The second protection circuit 1502 may be connected to the second data line D2 at a second node N2.

The third data line D3 may connect the third data pad PAD_D3 and a pixel PXL_3 among the pixels disposed at the third pixel column. The third protection circuit 1503 may be connected to the third data line D3 at a third node N3.

The fourth data line D4 may connect the fourth data pad PAD_D4 and a pixel PXL_4 among the pixels disposed at the fourth pixel column. a fourth protection circuit 1504 may be connected to the fourth data line D4 at the fourth node N4.

Similarly, the (m−1)-th data line D(m−1) may connect the (m−1)-th data pad PAD_D(m−1) and a pixel PXL_(m−1) among the pixels disposed in the (m−1)-th pixel column. The (m−1)-th protection circuit 150(m−1) may be connected to the (m−1)-th data line D(m−1) at an (m−1)-th node N(m−1).

The m-th data line Dm may connect the m-th data pad PAD_Dm and a pixel PXL_m among the pixels disposed in the m-th pixel column. The m-th protection circuit 150*m* may be connected to the m-th data line Dm at an m-th node Nm.

Each of the first data lines among the data lines D1 to Dm may be connected to a first protection circuit. Referring to FIG. 15, data lines (e.g., the first data line D1, the third data line D3, and the (m−1)-th data line D(m)−1), etc.) disposed at odd numbers among the data lines may correspond to the first data lines. Referring to FIG. 15, the first protection circuit 1501, the third protection circuit 1503, and the (m−1)-th protection circuit 150(m−1) may correspond to the first protection circuit.

Each of the second data lines among the data lines D1 to Dm, may be connected to a second protection circuit. Referring to FIG. 15, data lines (e.g., the second data line D2, the fourth data line D4, and the m-th data line Dm, etc.) disposed at even numbers among the data lines may correspond to the second data lines. Referring to FIG. 15, the second protection circuit 1502, the fourth protection circuit 1504, and the m-th protection circuit 150*m* may correspond to the second protection circuit.

Each of first protection circuits 1501, 1503, . . . , and 150(m−1) connected to odd-numbered data lines D1, D3, . . . , and D(m−1) among the data lines D1 to Dm, may correspond to the protection circuit PC of FIG. 6. In an embodiment, for example, one protection circuit 1501 of the protection circuits 1501, 1503, . . . , and 150(m−1) connected to odd-numbered data lines D1, D3, . . . , and D(m−1), may include the first transistor T1. The first electrode of the first transistor T1 may be connected to the first data line D1 at the first node N1. The second electrode of the first transistor T1 may be connected to the first gate power line VGHL. The gate electrode of the first transistor T1 may be connected to the second electrode of the first transistor T1.

Each of second protection circuits 1502, 1504, . . . , and 150*m* connected to even-numbered data lines D2, D4, . . . , and Dm among the data lines D1 to Dm, may correspond to the protection circuit PC of FIG. 8. In an embodiment, for example, one protection circuit 1502 of the protection circuits 1502, 1504, . . . , and 150*m* connected to the even-numbered data lines D2, D4, . . . , and Dm, may include the second transistor T2. The first electrode of the second transistor T2 may be connected to the second gate power line VGLL. The second electrode of the second transistor T2 may be connected to the second data line D2 at the second node N2. The gate electrode of the second transistor T2 may be connected to the second electrode of the second transistor T2.

Figure 16:
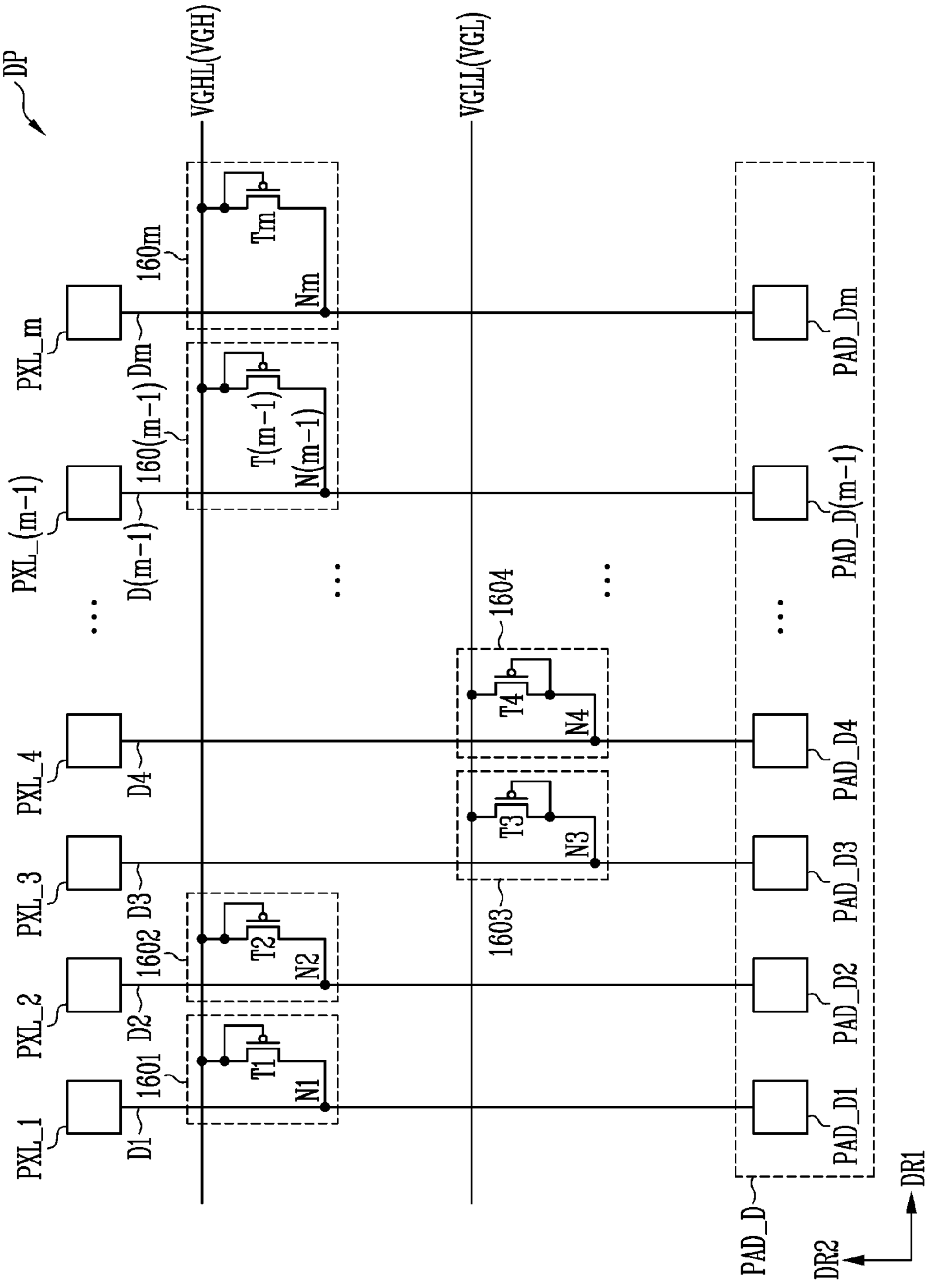
FIG. 16 is a block diagram illustrating another embodiment of a display panel including the protection circuit of FIGS. 6 and 8.

FIG. 16 is a block diagram illustrating another embodiment of a display panel including the protection circuit of FIGS. 6 and 8.

Referring to FIGS. 6, 8, and 16, an embodiment of the display panel DP may include data pads PAD_D, data lines D1 to Dm, a first gate power line VGHL, a second gate power line VGLL, and protection circuits 1601 to 160*m*.

The data pads PAD_D may include the first to m-th data pads PAD_D1 to PAD_Dm.

The data lines D1 to Dm may extend in the second direction DR2 and be sequentially arranged in the first direction DR1.

The first data line D1 may connect the first data pad PAD_D1 and a pixel PXL_1 among the pixels disposed at the first pixel column. The first protection circuit 1601 may be connected to the first data line D1 at the first node N1.

The second data line D2 may connect the second data pad PAD_D2 and a pixel PXL_2 among the pixels disposed at the second pixel column. The second protection circuit 1602 may be connected to the second data line D2 at the second node N2.

The third data line D3 may connect the third data pad PAD_D3 and a pixel PXL_3 among the pixels disposed at the third pixel column. The third protection circuit 1603 may be connected to the third data line D3 at the third node N3.

The fourth data line D4 may connect the fourth data pad PAD_D4 and a pixel PXL_4 among the pixels disposed at the fourth pixel column. The fourth protection circuit 1504 may be connected to the fourth data line D4 at the fourth node N4.

In such an embodiment, the (m−1)-th data line D(m−1) may connect the (m−1)-th data pad PAD_D(m−1) and a pixel PXL_(m−1) among the pixels disposed in the (m−1)-th pixel column. The (m−1)-th protection circuit 160(m−1) may be connected to the (m−1)-th data line D(m−1) at the (m−1)-th node N(m−1).

The m-th data line Dm may connect the m-th data pad PAD_Dm and a pixel PXL_m among the pixels disposed in the m-th pixel column. The m-th protection circuit 160*m* may be connected to the m-th data line Dm at the m-th node Nm.

A plurality of consecutive first data lines of at least some among a data lines may be connected to a plurality of first protection circuits, and a plurality of consecutive second data lines of remaining among the data lines may be connected to a plurality of second protection circuits.

Referring to FIG. 16, the first data line D1, the second data line D2, the (m−1)-th data line D(m−1), the m-th data line (D(m)), etc. may correspond to the first data line. The first protection circuit 1601, the second protection circuit 1602, the (m−1)-th protection circuit 160 (m−1), the m-th protection circuit 160*m*, etc. may correspond to the first protection circuit.

Referring to FIG. 16, the third data line D3, fourth data line D4, etc. may correspond to the second data line. The third protection circuit 1603, the fourth protection circuit 1604, etc. may correspond to the second protection circuit.

The first protection circuits 1601, 1602, . . . , 160(m−1), and 160*m* may correspond to the protection circuit PC of FIG. 6. The second protection circuits 1603, 1604, . . . , and the like may correspond to the protection circuit PC of FIG. 8.

Figure 17:
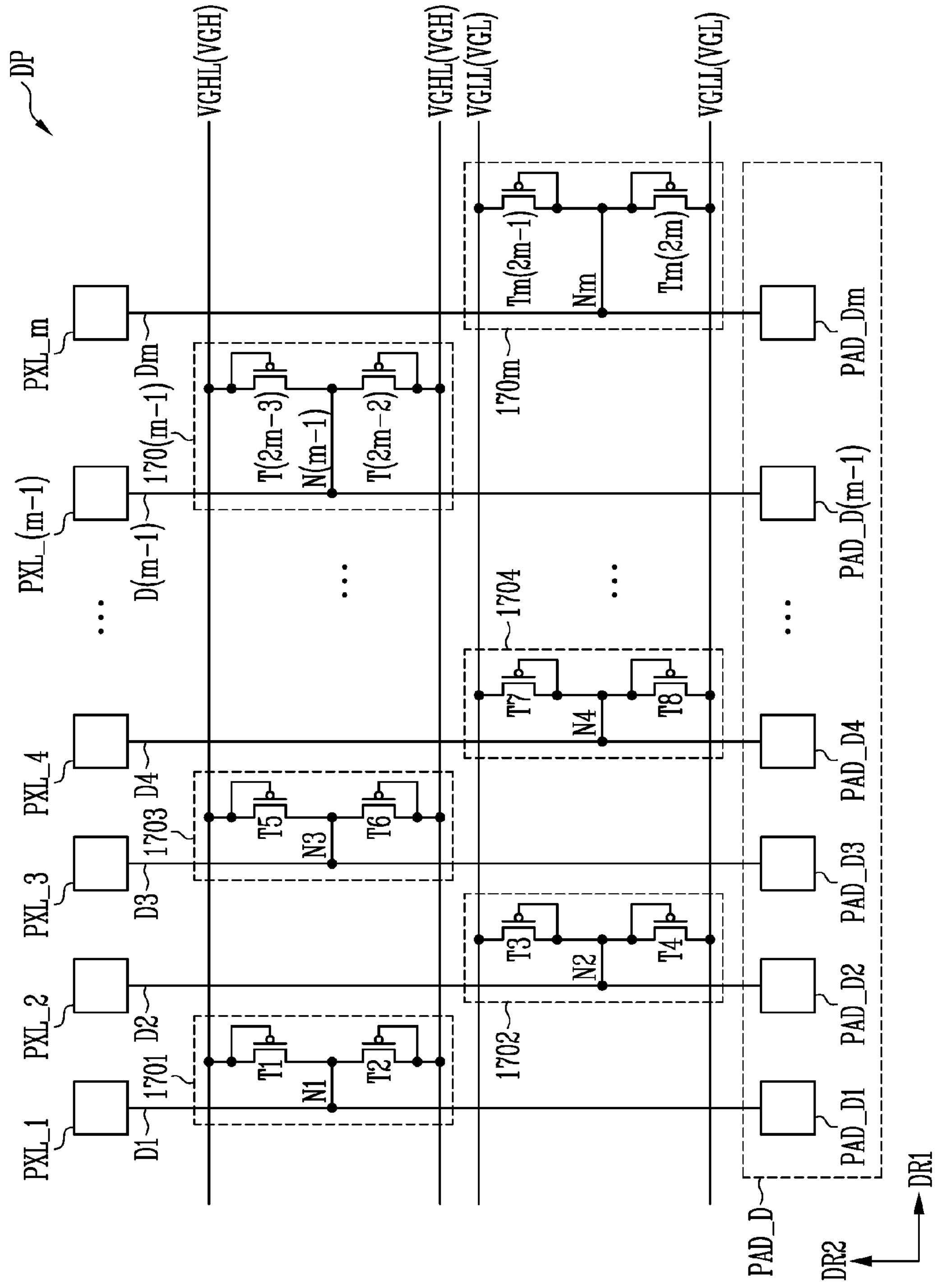
FIG. 17 is a block diagram illustrating an embodiment of a display panel including the protection circuit of FIGS. 10 and 12.

FIG. 17 is a block diagram illustrating an embodiment of a display panel including the protection circuit of FIGS. 10 and 12.

Referring to FIGS. 10, 12, and 17, an embodiment of the display panel DP may include data pads PAD_D, data lines D1 to Dm, a first gate power line VGHL, a second gate power line VGLL, and protection circuits 1701 to 170*m*.

The data pads PAD_D may include the first to m-th data pads PAD_D1 to PAD_Dm.

The data lines D1 to Dm may extend in the second direction DR2 and be sequentially arranged in the first direction DR1.

The first data line D1 may connect the first data pad PAD_D1 and a pixel PXL_1 among the pixels disposed at the first pixel column. The first protection circuit 1701 may be connected to the first data line D1 at the first node N1.

The second data line D2 may connect the second data pad PAD_D2 and a pixel PXL_2 among the pixels disposed at the second pixel column. The second protection circuit 1702 may be connected to the second data line D2 at the second node N2.

The third data line D3 may connect the third data pad PAD_D3 and a pixel PXL_3 among the pixels disposed at the third pixel column. The third protection circuit 1703 may be connected to the third data line D3 at the third node N3.

The fourth data line D4 may connect the fourth data pad PAD_D4 and a pixel PXL_4 among the pixels disposed at the fourth pixel column. The fourth protection circuit 1704 may be connected to the fourth data line D4 at the fourth node N4.

In such an embodiment, the (m−1)-th data line D(m−1) may connect the (m−1)-th data pad PAD_D(m−1) and a pixel PXL_(m−1) among the pixels disposed in the (m−1)-th pixel column. The (m−1)-th protection circuit 170(m−1) may be connected to the (m−1)-th data line D(m−1) at the (m−1)-th node N(m−1).

The m-th data line Dm may connect the m-th data pad PAD_Dm and a pixel PXL_m among the pixels disposed in the m-th pixel column. The m-th protection circuit 170*m* may be connected to the m-th data line Dm at the m-th node Nm.

Each of the first data lines among the data lines D1 to Dm may be connected to a first protection circuit. Referring to FIG. 17, the data lines (e.g., the first data line D1, the third data line D3, and the (m−1)-th data line D(m)−1), etc.) disposed at odd numbers among the data lines may correspond to the first data lines. Referring to FIG. 17, the first protection circuit 1701, the third protection circuit 1703, and the (m−1)-th protection circuit 170(m−1) may correspond to the first protection circuit.

Each of the second data lines among the data lines D1 to Dm, may be connected to a second protection circuit. Referring to FIG. 17, data lines (e.g., the second data line D2, the fourth data line D4, and the m-th data line Dm, etc.) disposed at even numbers among the data lines may correspond to the second data lines. Referring to FIG. 17, the second protection circuit 1702, the fourth protection circuit 1704, and the m-th protection circuit 170*m* may correspond to the second protection circuit.

Each of first protection circuits 1701, 1703, . . . , and 170(m−1) connected to odd-numbered data lines D1, D3, . . . , and D(m−1) among the data lines D1 to Dm, may correspond to the protection circuit PC of FIG. 10. Each of second protection circuits 1702, 1704, . . . , and 170*m* connected to even-numbered data lines D2, D4, . . . , and Dm among the data lines D1 to Dm, may correspond to the protection circuit PC of FIG. 12.

Figure 18:
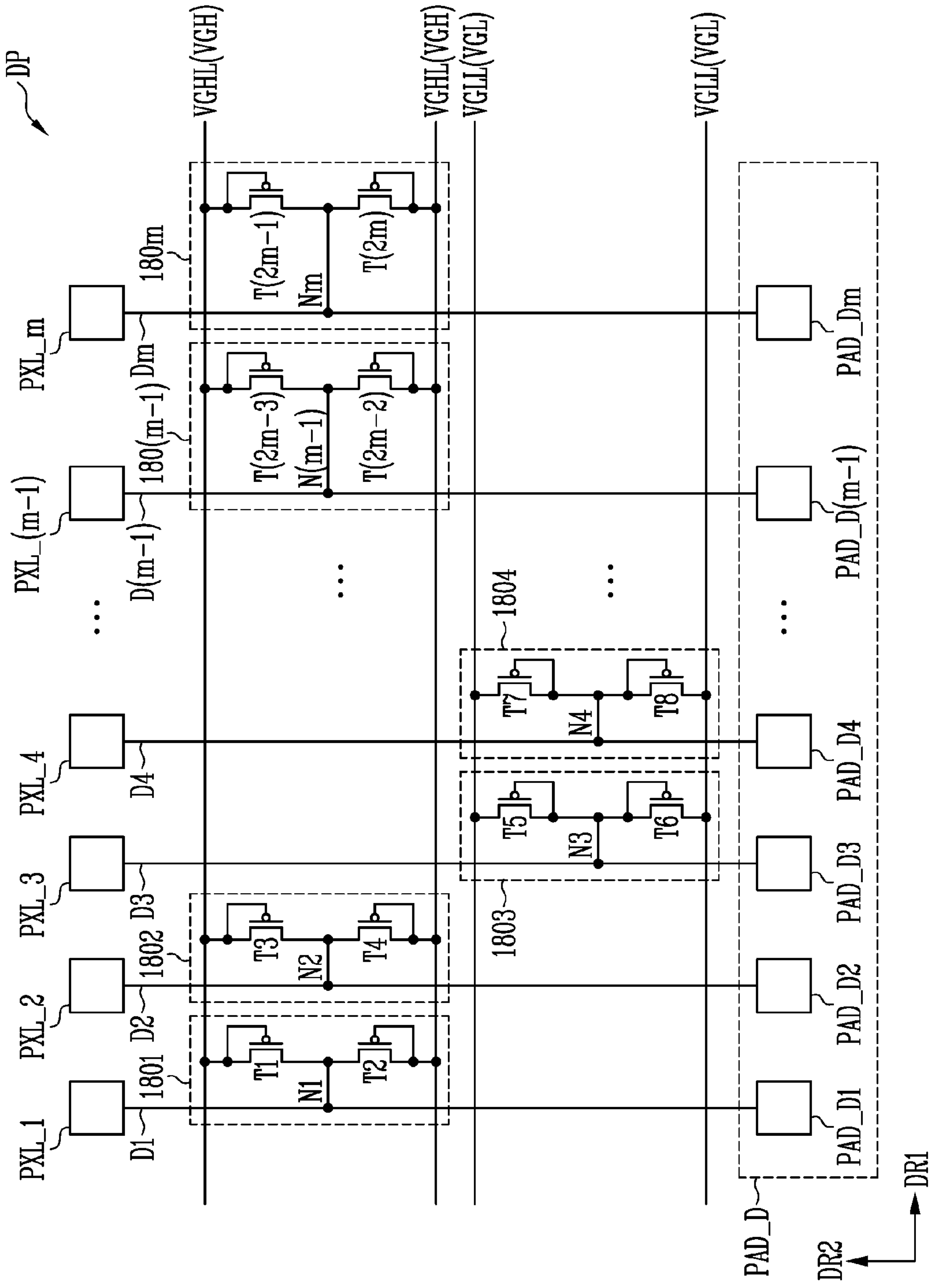
FIG. 18 is a block diagram illustrating another embodiment of a display panel including the protection circuit of FIGS. 10 and 12.

FIG. 18 is a block diagram illustrating another embodiment of a display panel including the protection circuit of FIGS. 10 and 12.

Referring to FIGS. 10, 12, and 18, an embodiment of the display panel DP may include data pads PAD_D, data lines D1 to Dm, a first gate power line VGHL, a second gate power line VGLL, and protection circuits 1801 to 180*m*.

The data pads PAD_D may include the first to m-th data pads PAD_D1 to PAD_Dm.

The data lines D1 to Dm may extend in the second direction DR2 and be sequentially arranged in the first direction DR1.

The first data line D1 may connect the first data pad PAD_D1 and a pixel PXL_1 among the pixels disposed at the first pixel column. The first protection circuit 1801 may be connected to the first data line D1 at the first node N1.

The second data line D2 may connect the second data pad PAD_D2 and a pixel PXL_2 among the pixels disposed at the second pixel column. The second protection circuit 1802 may be connected to the second data line D2 at the second node N2.

The third data line D3 may connect the third data pad PAD_D3 and a pixel PXL_3 among the pixels disposed at the third pixel column. The third protection circuit 1803 may be connected to the third data line D3 at the third node N3.

The fourth data line D4 may connect the fourth data pad PAD_D4 and a pixel PXL_4 among the pixels disposed at the fourth pixel column. The fourth protection circuit 1804 may be connected to the fourth data line D4 at the fourth node N4.

In such an embodiment, the (m−1)-th data line D(m−1) may connect the (m−1)-th data pad PAD_D(m−1) and a pixel PXL_(m−1) among the pixels disposed in the (m−1)-th pixel column. The (m−1)-th protection circuit 180(m−1) may be connected to the (m−1)-th data line D(m−1) at the (m−1)-th node N(m−1).

The m-th data line Dm may connect the m-th data pad PAD_Dm and a pixel PXL_m among the pixels disposed in the m-th pixel column. The m-th protection circuit (180*m*) may be connected to the m-th data line Dm at the m-th node Nm.

A plurality of consecutive first data lines of at least some among a data lines may be connected to a plurality of first protection circuits, and a plurality of consecutive second data lines of remaining among the data lines may be connected to a plurality of second protection circuits.

Referring to FIG. 18, the first data lines may correspond to the first data line D1, the second data line D2, . . . , the (m−1)-th data line D(m−1) and the m-th data line Dm, and the first protection circuit 1801, the second protection circuit 1802, . . . , the (m−1)-th protection circuit 180(m−1) and the m-th protection circuit 180*m* may correspond to the first protection circuit.

Referring to FIG. 18, the second data lines may correspond to the third data line D3 and the fourth data line D4, and the third protection circuit 1803 and the fourth protection circuit 1804 may correspond to the second protection circuit.

Each of the first protection circuits 1801, 1802, . . . , 180(m−1), and 180*m* may correspond to the protection circuit PC of FIG. 10. Each of the second protection circuits 1803, 1804, . . . , and the like may correspond to the protection circuit PC of FIG. 12.

Figure 19:
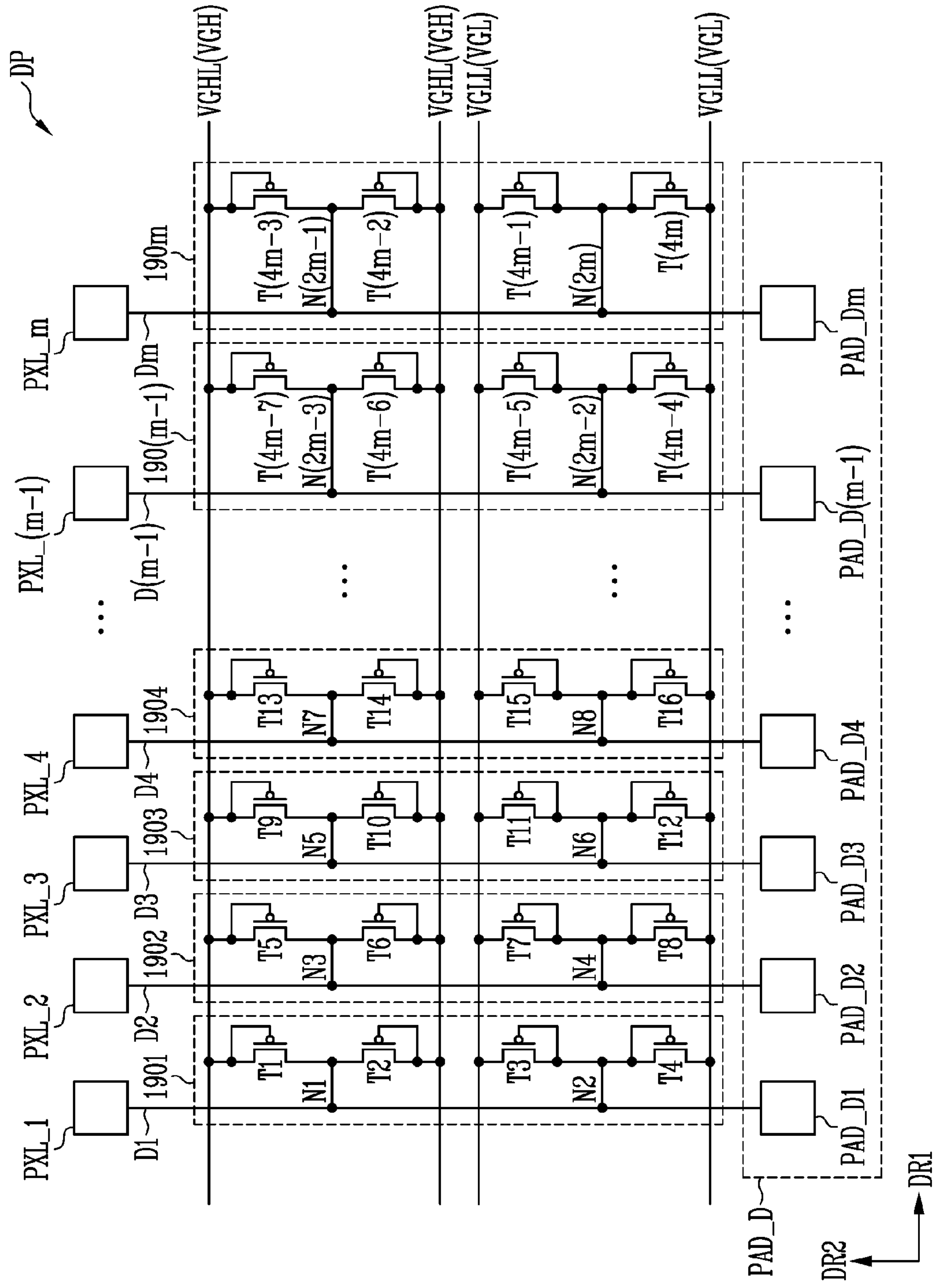
FIG. 19 is a block diagram illustrating an embodiment of a display panel including the protection circuit of FIG. 14.

FIG. 19 is a block diagram illustrating an embodiment of a display panel including the protection circuit of FIG. 14.

Referring to FIGS. 14 and 19, an embodiment of the display panel DP may include data pads PAD_D, data lines D1 to Dm, a first gate power line VGHL, a second gate power line VGLL, and protection circuits 1901 to 190*m*.

The data pads PAD_D may include the first to m-th data pads PAD_D1 to PAD_Dm.

The data lines D1 to Dm may extend in the second direction DR2 and be sequentially arranged in the first direction DR1.

The first data line D1 may connect the first data pad PAD_D1 and a pixel PXL_1 among the pixels disposed at the first pixel column. The first protection circuit 1901 may be connected to the first data line D1 at the first node N1.

The second data line D2 may connect the second data pad PAD_D2 and a pixel PXL_2 among the pixels disposed at the second pixel column. The second protection circuit 1902 may be connected to the second data line D2 at the second node N2.

The third data line D3 may connect the third data pad PAD_D3 and a pixel PXL_3 among the pixels disposed at the third pixel column. The third protection circuit 1903 may be connected to the third data line D3 at the third node N3.

The fourth data line D4 may connect the fourth data pad PAD_D4 and a pixel PXL_4 among the pixels disposed at the fourth pixel column. The fourth protection circuit 1904 may be connected to the fourth data line D4 at the fourth node N4.

In such an embodiment, the (m−1)-th data line D(m−1) may connect the (m−1)-th data pad PAD_D(m−1) and a pixel PXL_(m−1) among the pixels disposed in the (m−1)-th pixel column. The (m−1)-th protection circuit 190(m−1) may be connected to the (m−1)-th data line D(m−1) at the (m−1)-th node N(m−1).

The m-th data line Dm may connect the m-th data pad PAD_Dm and a pixel PXL_m among the pixels disposed in the m-th pixel column. The m-th protection circuit 190*m* may be connected to the m-th data line Dm at the m-th node Nm.

Each of the protection circuits 1901 to 190*m* may correspond to the protection circuit PC of FIG. 14. In an embodiment, for example, one protection circuit (e.g., the first protection circuit 1901) of the protection circuits 1901 to 190*m* may include a first transistor T1, a second transistor T2, and a third transistor T3, and a fourth transistor T4.

The first electrode of the first transistor T1 may be connected to the first data line D1 at the first node N1. The second electrode of the first transistor T1 may be connected to the first gate power line VGHL. The gate electrode of the first transistor T1 may be connected to the second electrode of the first transistor T1.

The first electrode of the second transistor T2 may be connected to the first data line D1 at the first node N1. The second electrode of the second transistor T2 may be connected to the first gate power line VGHL. The gate electrode of the second transistor T2 may be connected to the second electrode of the second transistor T2.

The first electrode of the third transistor T3 may be connected to the first data line D1 at the second node N2. The second electrode of the third transistor T3 may be connected to the second gate power line VGLL. The gate electrode of the third transistor T3 may be connected to the first electrode of the third transistor T3.

The first electrode of the fourth transistor T4 may be connected to the first data line D1 at the second node N2. The second electrode of the fourth transistor T4 may be connected to the second gate power line VGLL. The gate electrode of the fourth transistor T4 may be connected to the first electrode of the fourth transistor T4. The first electrode of the fourth transistor T4 may be connected to the first electrode of the fourth transistor T4.

According to embodiments of the disclosure, as described herein, the pixels PXL disposed on the display panel DP can be protected from the static electricity of a high voltage and/or a low voltage by a protection circuit.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display panel comprising:

pixels, each including a light emitting element and a pixel circuit connected to the light emitting element;

data lines arranged in a plurality of columns, wherein the data lines supply data signals to the pixel circuit;

data pads connected to the data lines;

a first protection circuit connected between a first data line among the data lines and a first gate power line to which a first gate power voltage is applied, wherein the first gate power voltage is a high gate power voltage applied to a gate driver; and a second protection circuit connected between a second data line among the data lines and a second gate power line to which a second gate power voltage is applied, wherein the second gate power voltage is a low gate power voltage applied to the gate driver, wherein the first gate power line is disconnected from the second data line, and the second gate power line is disconnected from the first data line.

2. The display panel of claim 1, wherein the pixel circuit includes a first transistor connected between a first power supply and the light emitting element, a second transistor connected between a corresponding one of the data lines and the first transistor, a first pixel node connected between the first transistor and the second transistor, and a second pixel node connected between the first transistor and the light emitting element.

3. The display panel of claim 2, wherein a semiconductor layer of a transistor constituting the first and second protection circuits is disposed in a same layer as a semiconductor layer of the first transistor constituting the pixel circuit.

4. The display panel of claim 1, wherein the first gate power voltage has a higher voltage level than the second gate power voltage.

5. The display panel of claim 1, wherein the first protection circuit includes a first transistor, and the second protection circuit includes a second transistor, wherein the first transistor includes a gate electrode, a first electrode connected to the first gate power line and electrically connected to the gate electrode of the first transistor, and a second electrode connected to the first data line, and wherein the second transistor includes a gate electrode electrically connected to the second data line, a first electrode connected to the second gate power line, and a second electrode connected to the second data line.

6. The display panel of claim 5, wherein the first data line is an odd-numbered data line among the data lines, and the second data line is an even-numbered data line among the data lines.

7. The display panel of claim 5, wherein the display panel includes a plurality of first protection circuits including the first protection circuit and a plurality of second protection circuits including the second protection circuit, a plurality of consecutive first data lines among the data lines are connected to the plurality of first protection circuits, a plurality of consecutive second data lines among the data lines are connected to the plurality of second protection circuits, and the plurality of consecutive first protection circuits and the plurality of consecutive second protection circuits are disposed adjacent to each other.

8. The display panel of claim 5, wherein the first protection circuit further includes a third transistor, and the second protection circuit further includes a fourth transistor, wherein the third transistor includes a gate electrode, a first electrode connected to a second electrode of the first transistor, and a second electrode connected to the first gate power line, and wherein the fourth transistor includes a gate electrode, a first electrode connected to a second electrode of the second transistor, and a second electrode connected to the second gate power line.

9. The display panel of claim 8, wherein the first data line is an odd-numbered data line among the data lines, and the second data line is an even-number data line among the data lines.

10. The display panel of claim 8, wherein the display panel includes a plurality of first protection circuits including the first protection circuit and a plurality of second protection circuits including the second protection circuit, a plurality of consecutive first data lines among the data lines are connected to the plurality of first protection circuits, a plurality of consecutive second data lines among the data lines are connected to the plurality of second protection circuits, and the plurality of consecutive first protection circuits and the plurality of consecutive second protection circuits are disposed adjacent to each other.

11. A display panel comprising:

pixels, each including a light emitting element and a pixel circuit connected to the light emitting element;

data lines arranged in a plurality of columns, wherein the data lines supply data signals to the pixel circuit;

data pads connected to the data lines; and protection circuits connected to the data lines, wherein each of the protection circuits includes first to fourth transistors, wherein the first transistor includes a gate electrode, a first electrode connected to a first gate power line and electrically connected to the gate electrode of the first transistor, and a second electrode connected to a corresponding one of the data lines, wherein the second transistor includes a gate electrode, a first electrode connected to the second electrode of the first transistor and the corresponding one of the data lines, and a second electrode electrically connected to the gate electrode of the second transistor and connected to the first gate power line, wherein the third transistor includes a gate electrode, a first electrode connected to a second gate power line and electrically connected to the gate electrode of the third transistor, and a second electrode connected to the corresponding one of the data lines, and wherein the fourth transistor includes a gate electrode, a first electrode connected to the second electrode of the third transistor and the corresponding one of the data lines, and a second electrode electrically connected to the gate electrode of the fourth transistor and connected to the second gate power line.

12. The display panel of claim 11, wherein the pixel circuit includes a first transistor connected between a first power supply and the light emitting element, a second transistor connected between a corresponding one of the data lines and the first transistor, a first pixel node connected between the first transistor and the second transistor, and a second pixel node connected between the first transistor and the light emitting element.

13. The display panel of claim 12, wherein a semiconductor layer of a transistor constituting the protection circuits is disposed in a same layer as a semiconductor layer of the first transistor constituting the pixel circuit.

14. An electronic device comprising:

a display device; and a processor configured to control the display device, wherein the display device comprises:

a display panel including pixels; and a data driver which applies data signals to the pixels, wherein the display panel includes data lines arranged in a plurality of columns, wherein the data lines supply data signals to the pixels, data pads connected to the data lines, a first protection circuit connected between a first data line among the data lines and a first gate power line to which a first gate power voltage is applied, wherein the first gate power voltage is a high gate power voltage applied to a gate driver, and a second protection circuit connected between a second data line among the data lines and a second gate power line to which a second gate power voltage is applied, wherein the second gate power voltage is a low gate power voltage applied to the gate driver, wherein the first gate power line is disconnected from the second data line, and the second gate power line is disconnected from the first data line.

15. The electronic device of claim 14, wherein the display device further comprising a gate driver which provides a gate signal to the pixels based on a start signal and a clock signal;

a start signal line which transmits the start signal to the gate driver; and a clock signal line which transmits the clock signal to the gate driver.

16. The electronic device of claim 14, wherein each of the pixels includes a light emitting element and a pixel circuit connected to the light emitting element, and the pixel circuit includes a first transistor connected between a first power supply and the light emitting element, a second transistor connected between a corresponding one of the data lines and the first transistor, a first pixel node connected between the first transistor and the second transistor, and a second pixel node connected between the first transistor and the light emitting element.

17. The electronic device of claim 16, wherein a semiconductor layer of a transistor constituting the first and second protection circuits is disposed in a same layer as a semiconductor layer of the first transistor constituting the pixel circuit.

* * * * *